United States Patent
Sakamoto et al.

(10) Patent No.: US 9,215,635 B2
(45) Date of Patent: Dec. 15, 2015

(54) COMMUNICATION SYSTEM AND COMMUNICATION METHOD

(75) Inventors: Mitsuru Sakamoto, Osaka (JP); Akira Ohshima, Osaka (JP); Tadashi Shimonabe, Osaka (JP); Yuhsuke Takagi, Osaka (JP); Takashi Naito, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 429 days.

(21) Appl. No.: 13/637,886

(22) PCT Filed: May 30, 2011

(86) PCT No.: PCT/JP2011/062370
§ 371 (c)(1),
(2), (4) Date: Sep. 27, 2012

(87) PCT Pub. No.: WO2011/152347
PCT Pub. Date: Aug. 12, 2011

(65) Prior Publication Data
US 2013/0017833 A1 Jan. 17, 2013

(30) Foreign Application Priority Data
Jun. 4, 2010 (JP) .................... 2010-128876

(51) Int. Cl.
*H04W 36/18* (2009.01)
*H04J 11/00* (2006.01)
(Continued)

(52) U.S. Cl.
CPC ............... *H04W 36/18* (2013.01); *H04B 7/022* (2013.01); *H04B 7/024* (2013.01); *H04J 11/0053* (2013.01); *H04J 11/0093* (2013.01); *H04W 36/0083* (2013.01)

(58) Field of Classification Search
CPC ... H04W 36/18; H04W 24/02; H04W 72/082; H04W 36/0083; H04W 36/30; H04W 92/20; H04W 40/36; H04W 92/22; H04B 7/024; H04B 7/022; H04J 11/0053; H04J 11/0093

USPC ......... 370/229, 230, 232, 328, 329, 331, 332, 370/338; 455/422.1, 434, 438, 440, 450, 455/509, 517, 525
See application file for complete search history.

(56) References Cited

U.S. PATENT DOCUMENTS 5,483,668 A * 1/1996 Malkamaki et al. .......... 455/442
6,975,608 B1 12/2005 Park et al.
(Continued)

FOREIGN PATENT DOCUMENTS

CN 101064956 A 10/2007
CN 101283619 A 10/2008
(Continued)

OTHER PUBLICATIONS

"3rd Generation Partnership Project; Technical Specification Group Radio Access Network; Further Advancements for E-UTRA Physical Layer Aspects (Release 9)," 3GPP TR 36.814, V1.5.0, Nov. 2009, pp. 1-53.
(Continued)

*Primary Examiner* — Dinh P Nguyen
(74) *Attorney, Agent, or Firm* — Birch, Stewart, Kolasch & Birch, LLP

(57) ABSTRACT

During a period of parallel-like radio communication with two or more first base stations, the first base station designates a second base station correlated with one of the two or more first base stations, and temporarily suspends the radio communication in accordance with a first communications standard to issue, to a mobile station, a request of measurement for the designated second base station. The first base station receives a result of the measurement for the designated second base station. The first base station notifies the mobile station of a handover from the first communications standard to a second communications standard, and also notifies the mobile station of a request for starting a coordination mode in which the two or more second base stations including the designated second base station establish communication with the mobile station in coordination with each other.

14 Claims, 16 Drawing Sheets

(51) Int. Cl.
*H04W 36/00* (2009.01)
*H04B 7/02* (2006.01)

(56) References Cited

U.S. PATENT DOCUMENTS

| | | | |
|---|---|---|---|
| 2004/0259547 A1* | 12/2004 | Lau et al. | 455/436 |
| 2007/0037601 A1 | 2/2007 | Mittal et al. | |
| 2008/0318547 A1* | 12/2008 | Ballou et al. | 455/410 |
| 2008/0318574 A1* | 12/2008 | Bi | 455/436 |
| 2009/0181694 A1* | 7/2009 | Byun et al. | 455/453 |

FOREIGN PATENT DOCUMENTS

| | | |
|---|---|---|
| CN | 101640901 A | 2/2010 |
| JP | 2001-169330 A | 6/2001 |
| JP | 2007-259238 A | 10/2007 |

OTHER PUBLICATIONS

"3rd Generation Partnership Project; Technical Specification Group Radio Access Network; Radio Resource Control (RRC); Protocol Specification (Release 9)," 3GPP TS 25.331, V9.1.0, Dec. 2009, pp. 1-1759.

"CoMP feedback overhead reduction based on precoded RS," 3GPP TSG RAN WG1 Meeting #58b R1-093949, Panasonic, Oct. 12-16, 2009, pp. 1-3.

"Evaluation Scenarios and Assumptions for Intra-eNB CoMP," 3GPP, R1-100820, NTT docomo, pp. 1-10.

* cited by examiner

COMMUNICATION SYSTEM AND COMMUNICATION METHOD

TECHNICAL FIELD

The present invention relates to a communication system in which a plurality of different communications standards coexists, and a communication method in the communication system. More specifically, the present invention relates to a handover process between different communications standards.

BACKGROUND ART

Currently, the 3GPP (Third Generation Partnership Project) is fostering standardization of LTE-A (LTE-Advanced) as a new mobile communication technology. The LTE-A is an advanced standard of LTE (Long Term Evolution).

According to the specifications of the LTE, a mobile station communicates with one base station. In contrast to this, the following matter is under review with regard to the LTE-A. Namely, a plurality of base stations shares information and communicates with a mobile station in coordination with each other. Such a technique is referred to as coordinated multiple point transmission and reception (hereinafter, also abbreviated as "CoMP").

As compared with the LTE, the LTE-A is expected to improve a user throughput and a cell throughput at a cell edge (refer to Non-Patent Literature 1). Hence, it has been studied to use the foregoing CoMP for each of a down link (line) and an up link (line).

Non-Patent Literature 2 discloses a method by which a mobile station required even upon utilization of CoMP acquires a peripheral cell list. Moreover, Non-Patent Literature 3 discloses an example of a method for starting CoMP in LTE-A. Furthermore, Non-Patent Literature 4 proposes to carry out only CoMP between sectors in a cell (Intra-eNB) rather than CoMP between cells (Inter-eNB) on starting of the LTE-A. Detailed description of these non-patent literatures will be given later.

It is assumed that network service providers who provide services using a communications standard referred to as the so-called third generation will adopt LTE and LTE-A. As an actual problem, the network service provider will attempt to reduce installation costs by utilizing the current assets as much as possible in order to adopt the LTE/LTE-A as a matter of course. Therefore, it is assumed that an LTE/LTE-A base station is installed in the same place (typically, in the same equipment storage place) as a current base station.

In such a case, when a cell range of the LTE/LTE-A base station is smaller than a cell range of the corresponding existing base station (third generation), services of the LTE/LTE-A cannot be utilized in some regions. For this reason, typically, the cell range of the LTE/LTE-A base station is designed to be equal to or more than that of the existing base station.

The use of a mobile station (User Equipment) capable of utilizing both the service of the existing third generation and the service of the LTE/LTE-A allows a handover between the communications standards.

CITATION LIST

Non-Patent Literature

NPTL 1: 3GPP Organizational Partners, "3rd Generation Partnership Project; Technical Specification Group Radio Access Network; Further Advancements for E-UTRA Physical Layer Aspects (Release 9)", 3GPP TR36.814 v1.5.0 (2009-11), pp. 12-16 (8. Coordinated multiple point transmission and reception)

NPTL 2: 3GPP Organizational Partners, "3rd Generation Partnership Project; Technical Specification Group Radio Access Network; Radio Resource Control (RRC); Protocol Specification (Release 9)", 3GPP TS25.331 V9.1.0 (2009-12), pp. 53-520 (8. RRC procedures)

NPTL 3: Panasonic, "CoMP feedback overhead reduction based on precoded RS", 3GPP TSG RAN WG1 Meeting #58b, R1-093949, Miyazaki, Japan, 12th-16th, Oct., 2009

NPTL 4: NTT DOCOMO, "Evaluation Scenarios and Assumptions for Intra-eNB CoMP", 3GPP R1-100820

SUMMARY OF INVENTION

Technical Problem

In a case of performing a handover from a service of third generation to a service of LTE-A, for example, conversation/communication quality is improved in some instances when CoMP is utilized immediately after the handover. However, the currently proposed technique could not utilize CoMP immediately after a handover from a different communication system to LTE-A.

The present invention has been devised to solve the problems described above, and an object thereof is to provide a communication system in which, at the time of a handover from a first communications standard to a second communications standard, two or more base stations in accordance with the second communications standard are capable of establishing communication with a mobile station in coordination with each other, and a communication method in the communication system.

Solution to Problem

A communication system according to one aspect of the present invention includes a plurality of first base stations for establishing radio communication in accordance with a first communications standard with a mobile station, and a plurality of second base stations for establishing radio communication in accordance with a second communications standard with the mobile station. The plurality of second base stations is arranged while being correlated with the plurality of first base stations, respectively. In each set of the first base station and the second base station correlated with each other, cell ranges of both the base stations are configured to be substantially identical with each other. The communication system also includes means for starting parallel-like radio communication between the mobile station and two or more of the first base stations, means for designating, for the mobile station, the second base station correlated with one of the two or more first base stations, and temporarily suspending the radio communication in accordance with the first communications standard to request measurement for the designated second base station during the period of the parallel-like radio communication with the two or more first base stations, and means for notifying the mobile station of a handover from the first communications standard to the second communications standard and notifying the mobile station of a request for starting a coordination mode in which the two or more second base stations including the designated second base station establish communication with the mobile station in coordination with each other, on the basis of a result of the measurement for the designated second base station.

Preferably, the request for starting the coordination mode includes information of a method of reporting, to the second base station, a result of measurement for the two or more second base stations.

More preferably, the information of the method of reporting to the second base station includes definition of a communication method for transmitting information of each channel measured by the mobile station.

Preferably, the communication system further includes means for selecting any one of a plurality of modes in which the two or more second base stations are capable of establishing communication in coordination with each other, on the basis of the result of the measurement for the two or more second base stations.

Preferably, the communication system further includes means for determining whether or not the handover from the first communications standard to the second communications standard is required, on the basis of a result of measurement for the two or more first base stations measured by the mobile station, during the period of parallel-like radio communication with the two or more first base stations.

Preferably, when the mobile station receives the notification of the handover from the first communications standard to the second communications standard, the mobile station terminates the operation of temporarily suspending the radio communication in accordance with the first communications standard.

Preferably, the second base station correlated with the first base station which is a serving cell in the parallel-like radio communication with the two or more first base stations is designated.

According to another aspect of the present invention, there is provided a communication method in a communication system that includes a plurality of first base stations for establishing radio communication in accordance with a first communications standard with a mobile station, and a plurality of second base stations for establishing radio communication in accordance with a second communications standard with the mobile station. The plurality of second base stations is arranged while being correlated with the plurality of first base stations. In each set of the first base station and the second base station correlated with each other, cell ranges of both the base stations are configured to be substantially identical with each other. The communication method includes a step of starting parallel-like radio communication between the mobile station and two or more of the first base stations, a step of designating by the first base station, for the mobile station, the second base station correlated with one of the two or more first base stations, and temporarily suspending the radio communication in accordance with the first communications standard to request measurement for the designated second base station, during the period of the parallel-like radio communication with the two or more first base stations, a step of receiving at the first base station a result of the measurement for the designated second base station, and a step of notifying, by the first base station, the mobile station of a handover from the first communications standard to the second communications standard and notifying, by the first base station, the mobile station of a request for starting a coordination mode in which the two or more second base stations including the designated second base station establish communication with the mobile station in coordination with each other.

Advantageous Effect of Invention

According to the present invention, at the time of a handover from a first communications standard to a second communications standard, two or more base stations in accordance with the second communications standard are capable of establishing communication with a mobile station in coordination with each other.

DESCRIPTION OF EMBODIMENTS

Figure 1:
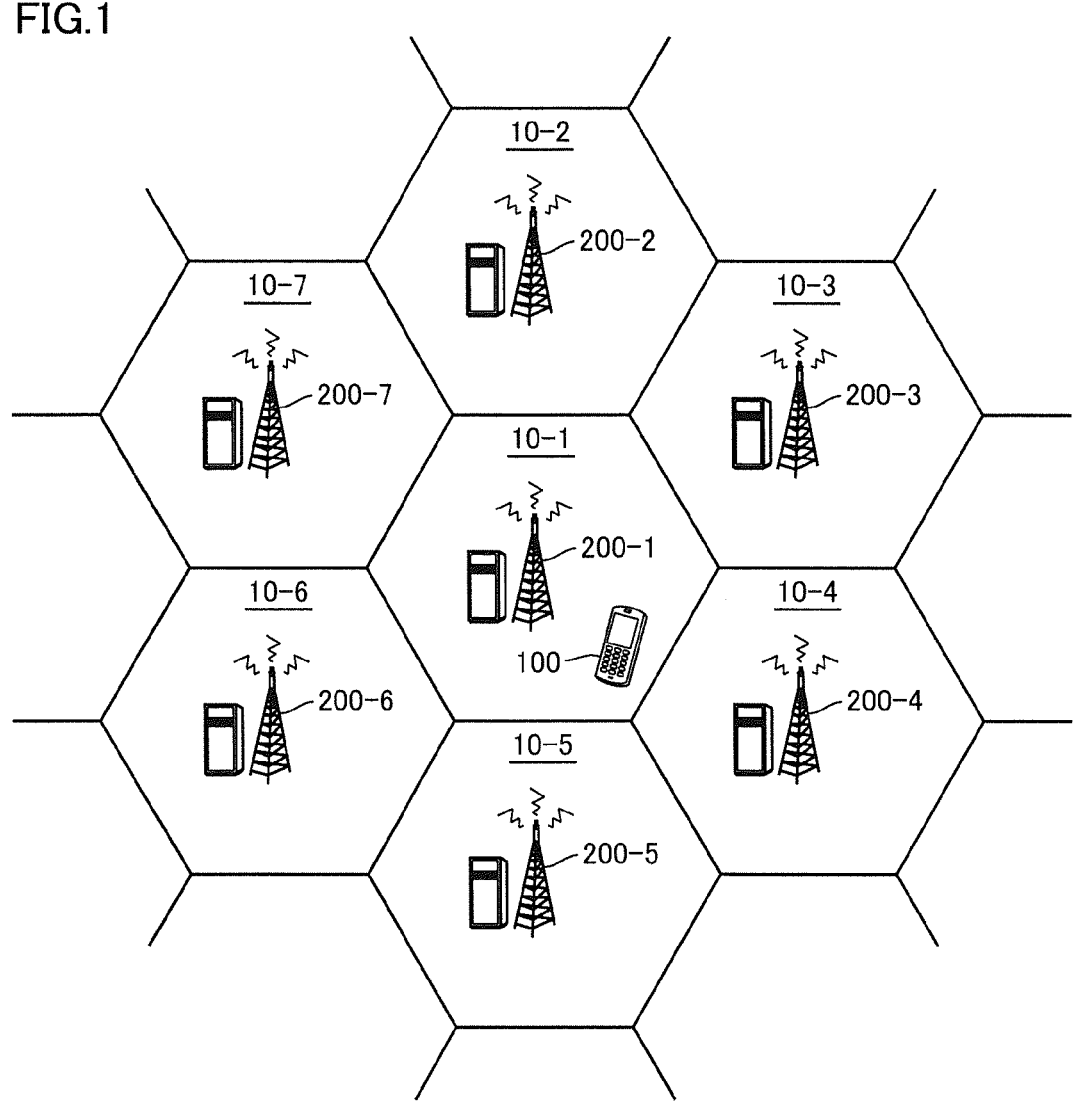
FIG. 1 is a diagram for illustrating a cell arrangement of an existing communication system to be assumed in an embodiment of the present invention.

With reference to the drawings, detailed description will be given of embodiments of the present invention. Herein, identical or corresponding portions in the drawings are denoted with identical reference signs, and the description thereof will not be given repeatedly.

A. System Configuration

Figure 2:
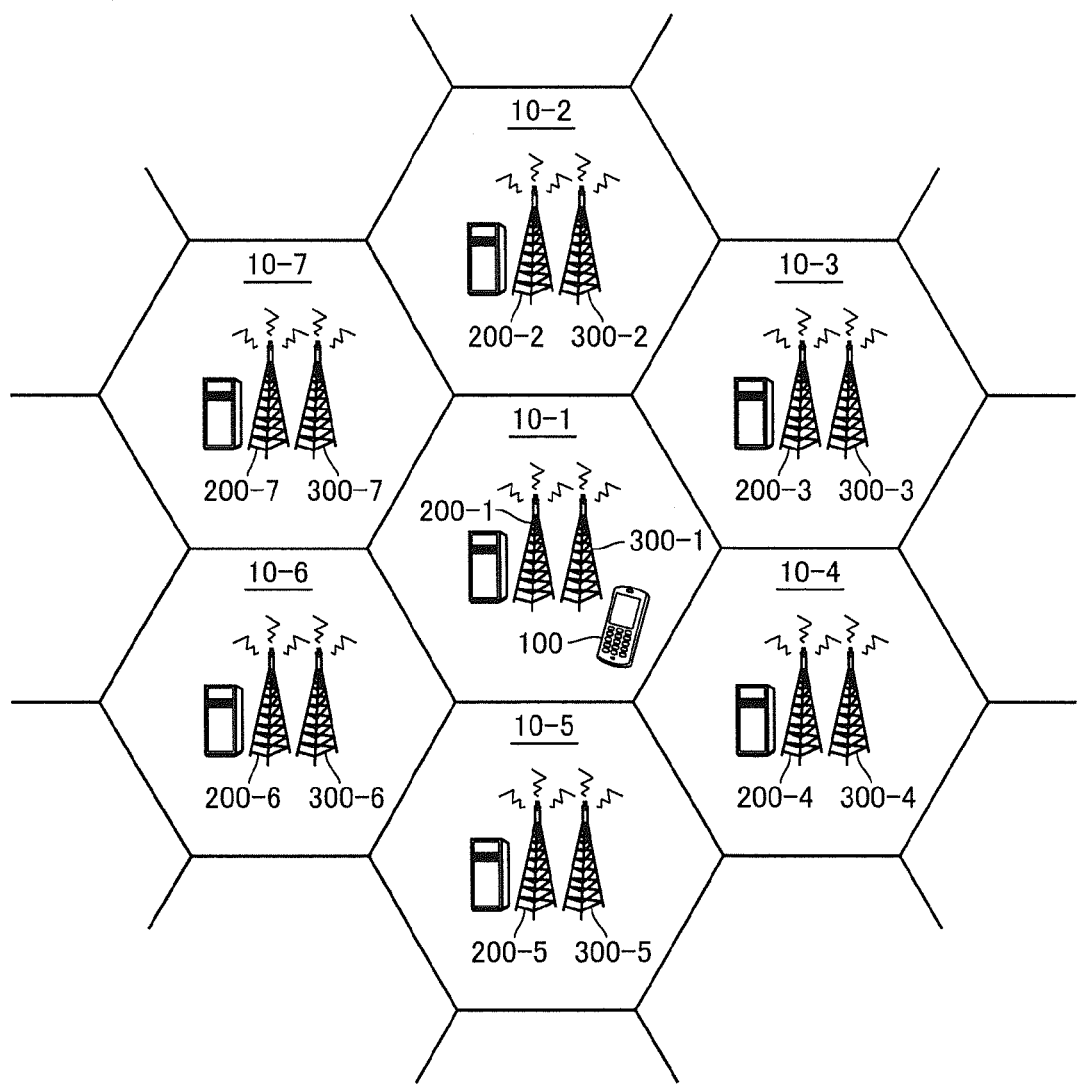
FIG. 2 is a diagram for illustrating a case of introducing a new communication system into the cell arrangement of the existing communication system shown in FIG. 1.

FIG. 1 is a diagram for illustrating a cell arrangement of an existing communication system to be assumed in the embodiment of the present invention. FIG. 2 is a diagram for illustrating a case of introducing a new communication system into the cell arrangement of the existing communication system shown in FIG. 1.

In the present embodiment, as a typical example, a "W-CDMA standard" is assumed as the existing communication system (first communications standard), and an "LTE-A standard" is assumed as the newly introduced communication system (second communications standard). In this description, the "LTE-A standard" may include an "LTE standard" having backward compatibility.

The present invention is not limited to the foregoing example, and is applicable to any communications standard(s) as long as a communication system allows coordinated transmission and reception among a plurality of mobile stations or among a plurality of sectors in a certain mobile station.

As shown in FIG. 1, for example, consideration is given to a communication system in which cells 10-1, 10-2, . . . , and 10-N (hereinafter, collectively referred to as "cell 10") each having a predetermined cell range are arranged. In cells 10-1, 10-2, . . . , and 10-N, base stations 200-1, 200-2, . . . , and 200-N (hereinafter, collectively referred to as "base station 200") in accordance with the W-CDMA standard are installed, respectively. Herein, the cell range of cell 10 depends on the degree of transmit power of corresponding base station 200.

On the other hand, a mobile station 100 serving as a communication terminal establishes radio communication with at least one of base station 200 in the cell where mobile station 100 exists and base station 200 in the cell adjoining to the cell to provide communication/conversation with a counterpart. In the following description, data communication between mobile station 100 and the counterpart (or a relay station), speech communication between mobile station 100 and the counterpart (or the relay station) and the like are collectively referred to as "communication", and data to be "communicated" are referred to as "user data".

In a case where there is the communication system in accordance with the W-CDMA standard shown in FIG. 1, it is considered herein that a communication system in accordance with the LTE-A standard is further introduced. In this case, as a matter of course, a network service provider who provides a service of the existing W-CDMA standard will attempt to reduce installation costs by utilizing current assets (the communication system in accordance with the W-CDMA standard) as much as possible in order to introduce the communication system in accordance with the LTE-A standard.

As shown in FIG. 2, therefore, the network service provider typically installs base stations 300-1, 300-2, . . . , and 300-N each in accordance with the LTE standard in the same places (cells 10-1, 10-2, . . . , and 10-N) as base stations 200-1, 200-2, . . . , and 200-N to be set in the existing communication system in accordance with the W-CDMA standard, respectively. Namely, base station 300-1 in accordance with the LTE standard is installed and set so as to cover substantially the same range as cell 10-1 covered by the base station 200-1 in accordance with the W-CDMA standard.

Moreover, mobile station 100 to be used in the communication system shown in FIG. 2 is compatible with each of the W-CDMA standard and the LTE-A standard (dual standard).

The following description is given of the details of an assumption that two communications standards coexist in the communication system as shown in FIG. 2.

Namely, the communication system according to the present embodiment shown in FIG. 2 includes the plurality of base stations 200 for establishing radio communication in accordance with the W-CDMA (first communications standard) with mobile station 100, and the plurality of base stations 300 for establishing radio communication in accordance with the LTE-A (second communications standard) with mobile station 100. Base stations 300-1, 300-2, . . . , and 300-N in accordance with the LTE-A are arranged while being correlated with base stations 200-1, 200-2, . . . , and 200-N in accordance with the W-CDMA, respectively. In each set of base station 200 and base station 300 correlated with each other, cell ranges of both the base stations are configured to be substantially identical with each other.

In this communication system, mobile station 100 is capable of utilizing a function capable of mutually switching between communication in accordance with the W-CDMA standard and communication in accordance with the LTE-A standard (in accordance with a communication status and the like) (handover). Herein, the handover between the different communication systems is also referred to as "Inter-RAT (Radio Access Technology) handover" for the purpose of a comparison with a handover in a single communication system (Intra-RAT handover).

Namely, the communication system according to the present embodiment allows switchover from the W-CDMA standard to the LTE-A standard and/or switchover from the LTE-A standard to the W-CDMA standard. In this Inter-RAT handover process, typically, the communication between mobile station 100 and the counterpart, which has been established immediately before the process, is maintained. Namely, the Inter-RAT handover process is to switch between base station 200 and base station 300 as the counterpart establishing radio communication with mobile station 100. This indicates that a user of mobile station 100 can maintain conversation or data communication without being aware of the execution of the Inter-RAT handover process.

B. Configurations of Base Stations 200, 300

Figure 3:
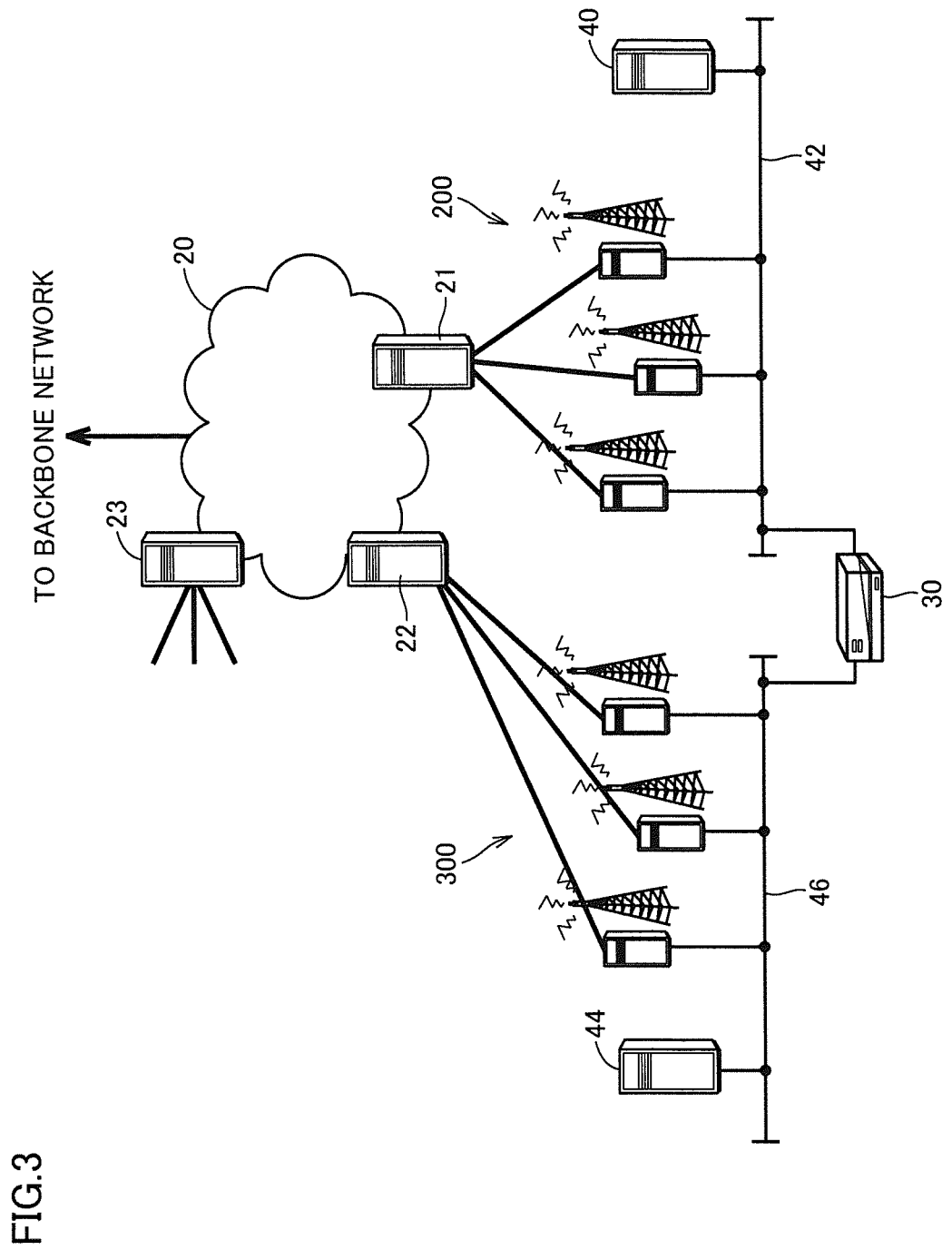
FIG. 3 is a diagram showing a network configuration for implementing the communication system according to the embodiment of the present invention.
Figure 4:
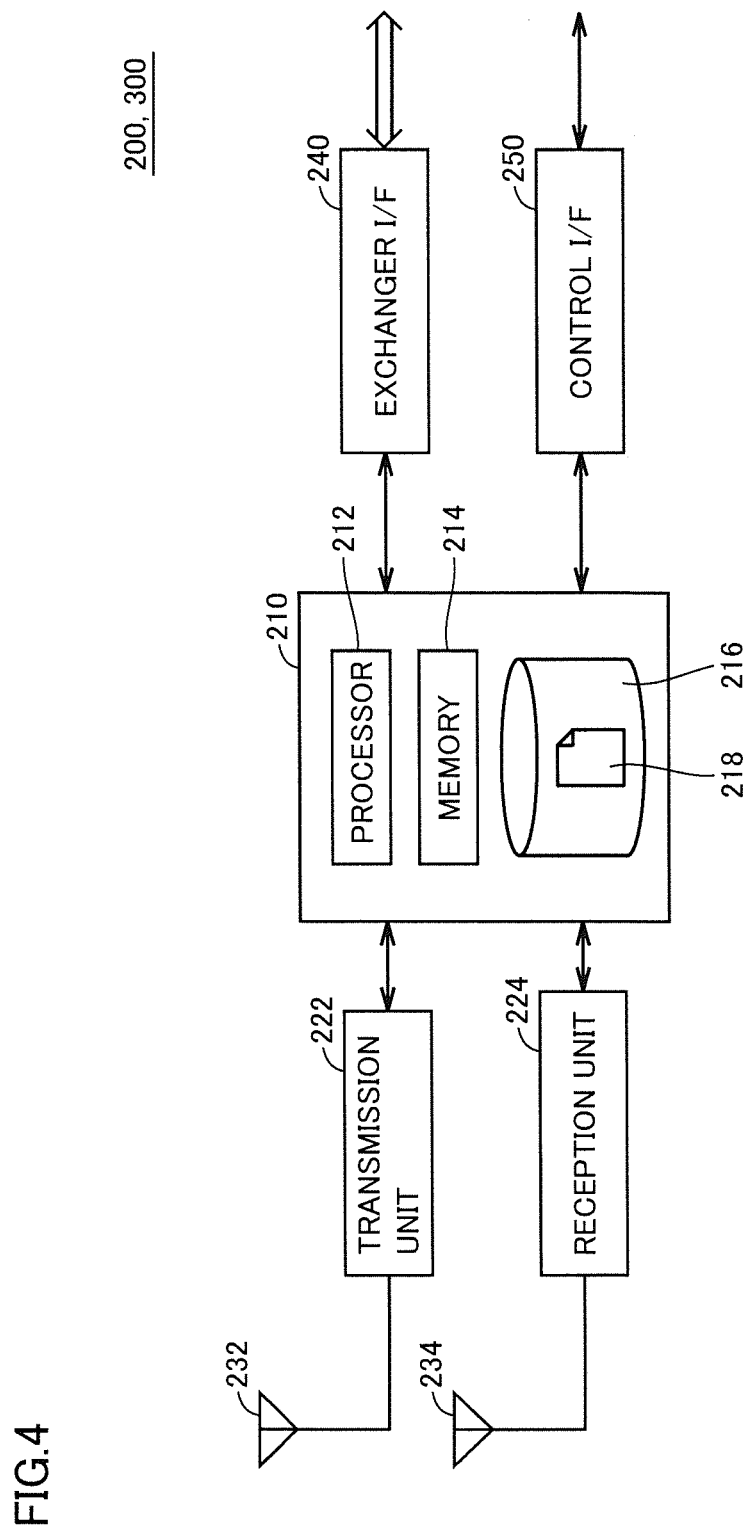
FIG. 4 is a block diagram of a base station to be utilized in the communication system according to the embodiment of the present invention.

FIG. 3 is a diagram showing a network configuration for implementing the communication system according to the embodiment of the present invention. FIG. 4 is a block diagram of base station 200 or 300 to be utilized in the communication system according to the embodiment of the present invention.

With reference to FIG. 3, the plurality of base stations 200 in accordance with the W-CDMA standard and the plurality of base stations 300 in accordance with the LTE-A standard are connected to a common network 20, respectively, so as to perform the Inter-RAT handover process, respectively. In the configuration example shown in FIG. 3, a plurality of exchangers 21, 22, 23, . . . is connected in network 20. As for these exchangers, it is assumed that base station 200 in accordance with the W-CDMA standard is connected to exchanger 21 and base station 300 in accordance with the LTE-A standard is connected to exchanger 22.

The communication/conversation between mobile station 100 and the counterpart is provided in such a manner that user data are sequentially relayed between mobile station 100/the counterpart and these exchangers 21, 22, 23, . . . or exchangers (not shown) connected to a backbone network at an upper level.

Moreover, base stations 200 in accordance with the W-CDMA standard are configured to allow mutual data communication via a control network 42 in order to exchange control data for a handover and roaming to be described later. Control network 42 is further connected with a radio network controller (RNC) 40. Basically, radio network controller 40 determines whether or not a handover or roaming is permitted.

Likewise, base stations 300 in accordance with the LTE-A standard are configured to allow mutual data communication via a control network 46 in order to exchange control data for CoMP and roaming to be described later. Upon establishment of CoMP, negotiation may be made in such a manner that control data are directly exchanged between concerned base stations 300, or determination may be made via radio network controller 44 as in the W-CDMA standard. In the latter case, radio network controller 44 is connected to control network 46.

In the communication system according to the present embodiment, further, control network 42 and control network 46 are connected to each other via a gateway 30 so as to perform the Inter-RAT handover between the W-CDMA standard and the LTE-A standard.

When the Inter-RAT handover is carried out in the communication system according to the present embodiment, the control data are exchanged between radio network controller 40 on the W-CDMA side and base station 300 or radio network controller 44 on the LTE-A side, and determination as to whether or not the Inter-RAT handover is permitted is made on the basis of a result of this data exchange.

For facilitation of the description, FIG. 3 shows the configuration that network 20 for carrying voice and the like and control networks 42 and 52 for controlling radio access are provided independently; however, the present invention may adopt a configuration that these networks are standardized in a case of so-called all-IP. Further, the present invention may also adopt a more complicated network configuration, using various types of packet transfer techniques and the like.

With reference to FIG. 4, each of base stations 200 in accordance with the W-CDMA standard includes a control unit 210, a transmission unit 222, a reception unit 224, a transmitting antenna 232, a receiving antenna 234, an exchanger interface (IT) 240 and a control interface (I/F) 250.

Control unit 210 includes a processor 212, a memory 214 and a storage unit 216, and controls entire base station 200. Memory 214 holds programs and various data to be transmitted and received, and processor 212 executes various processes on the basis of the various data held by memory 214. Storage unit 216 holds a list of different base stations 200 located at the periphery of each base station 200 (peripheral cell list 218) and location data of mobile station 100. Processor 212 refers to peripheral cell list 218 to perform processes such as (Inter-RAT and Intra-RAT) handovers and roaming.

Transmission unit 222 is connected to transmitting antenna 232, generates a radio signal responsive to user data or control data received from control unit 210, and emits the radio signal from transmitting antenna 232.

Reception unit 224 receives a radio signal from mobile station 100 via receiving antenna 234, demodulates the radio signal into user data or control data, and outputs the demodulated data to control unit 210.

Exchanger interface 240 exchanges user data with exchanger 21 (see FIG. 3) connected to the upper level of the base station. Likewise, control interface 250 exchanges control data with radio network controller 40 or different base station 200 via control network 42 (see FIG. 3) to which the base station is connected.

Base station 300 in accordance with the LTE-A standard is similar in configuration to base station 200 described above, and therefore the detailed description thereof will not be given repeatedly.

C. Configuration of Mobile Station 100

Figure 5:
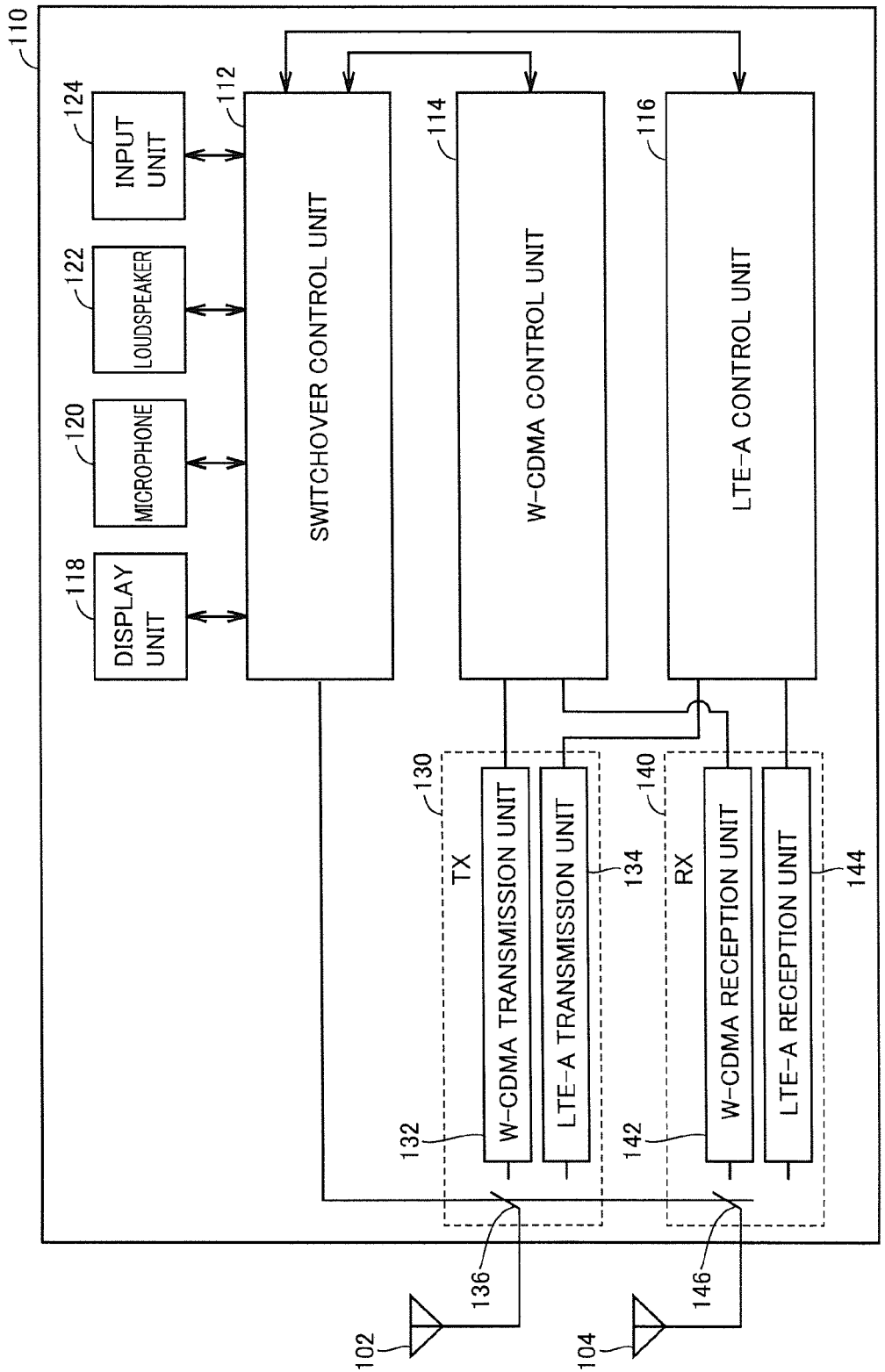
FIG. 5 is a block diagram of a mobile station to be utilized in the communication system according to the embodiment of the present invention.

FIG. 5 is a block diagram of mobile station 100 to be utilized in the communication system according to the embodiment of the present invention.

With reference to FIG. 5, mobile station 100 includes a housing 110 provided with a transmission antenna 102 for transmitting a radio signal and a reception antenna 104 for receiving a radio signal. Housing 110 includes a switchover control unit 112, a W-CDMA control unit 114, an LTE-A control unit 116, a transmission module 130 and a reception module 140. Transmission module 130 includes a W-CDMA transmission unit 132 and an LTE-A transmission unit 134. Moreover, reception module 140 includes a W-CDMA reception unit 142 and an LTE-A reception unit 144.

Switchover control unit 112 is a unit for controlling switchover between the W-CDMA standard and the LTE-A standard as will be described later, and issues a command as to which one of the W-CDMA standard and the LTE-A standard is validated to transmission module 130 and reception module 140, on the basis of control data to be exchanged between W-CDMA control unit 114 and LTE-A control unit 116.

W-CDMA control unit 114 controls communication in accordance with the W-CDMA standard. More specifically, W-CDMA control unit 114 outputs user data or control data to be transmitted, to W-CDMA transmission unit 132 of transmission module 130, and receives data received and decoded by W-CDMA reception unit 142 of reception module 140.

LTE-A control unit 116 controls communication in accordance with the LTE-A standard. More specifically, LTE-A control unit 116 outputs user data or control data to be transmitted, to LTE-A transmission unit 134 of transmission module 130, and receives data received and decoded by LTE-A reception unit 144 of reception module 140.

Transmission module 130 includes a switch 136, and transmits a radio signal to base station 200 or 300, using one of W-CDMA transmission unit 132 and LTE-A transmission unit 134, in accordance with a command from switchover control unit 112. Namely, switchover control unit 112 previously determines which one of the radio signal in accordance with the W-CDMA standard and the radio signal in accordance with the LTE-A standard should be transmitted to the base station, on the basis of control data on a control channel to be established between mobile station 100 and base station 200 or 300, and the like, and suitably switches switch 136. In the case where the radio signal in accordance with the W-CDMA standard should be transmitted, W-CDMA transmission unit 132 performs encoding and modulation, and emits the resultant of the encoding and modulation from transmission antenna 102. On the other hand, in the case where the radio signal in accordance with the LTE-A standard should be transmitted, LTE-A transmission unit 134 performs encoding and modulation, and emits the resultant of the encoding and modulation from transmission antenna 102.

Reception module 140 includes a switch 146, and transfers a radio signal received from base station 200 or 300, to one of W-CDMA reception unit 142 and LTE-A reception unit 144 in accordance with a command from switchover control unit 112. Namely, switchover control unit 112 previously determines which one of the radio signal in accordance with the W-CDMA standard and the radio signal in accordance with the LTE-A standard should be transmitted from the base station, on the basis of control data on a control channel to be established between mobile station 100 and base station 200 or 300, and suitably switches switch 146. In the case where the radio signal in accordance with the W-CDMA standard is received, W-CDMA reception unit 142 performs demodulation and decoding, and outputs the resultant of the demodulation and decoding to W-CDMA control unit 114. On the other hand, in the case where the radio signal in accordance with the LTE-A standard is received, LTE-A reception unit 144 performs demodulation and decoding, and outputs the resultant of the demodulation and decoding to LTE-A control unit 116.

With regard to switchover control unit 112, W-CDMA control unit 114, LTE-A control unit 116, transmission module 130 and reception module 140, all or part of these functions may be implemented as software. In this case, an arithmetic device (processor) such as a CPU (Central Processing Unit) or a DSP (Digital Signal Processor) executes a preinstalled command set. In such a case, an SoC (System On a Chip) in which components such as a processor, a memory and a peripheral device controller are integrated into a chip may also be utilized. Alternatively, all or part of these components may be implemented as dedicated hardware.

Housing 110 also includes a display unit 118 for displaying various kinds of information, a microphone 120 for acquiring the voice of a user, and the like, a loudspeaker 122 for reproducing the received voice, and an input unit 124 for accepting user manipulations. Typically, these units are disposed to be bared from housing 110.

D. Physical Layers in LTE/LTE-A

Figure 6:
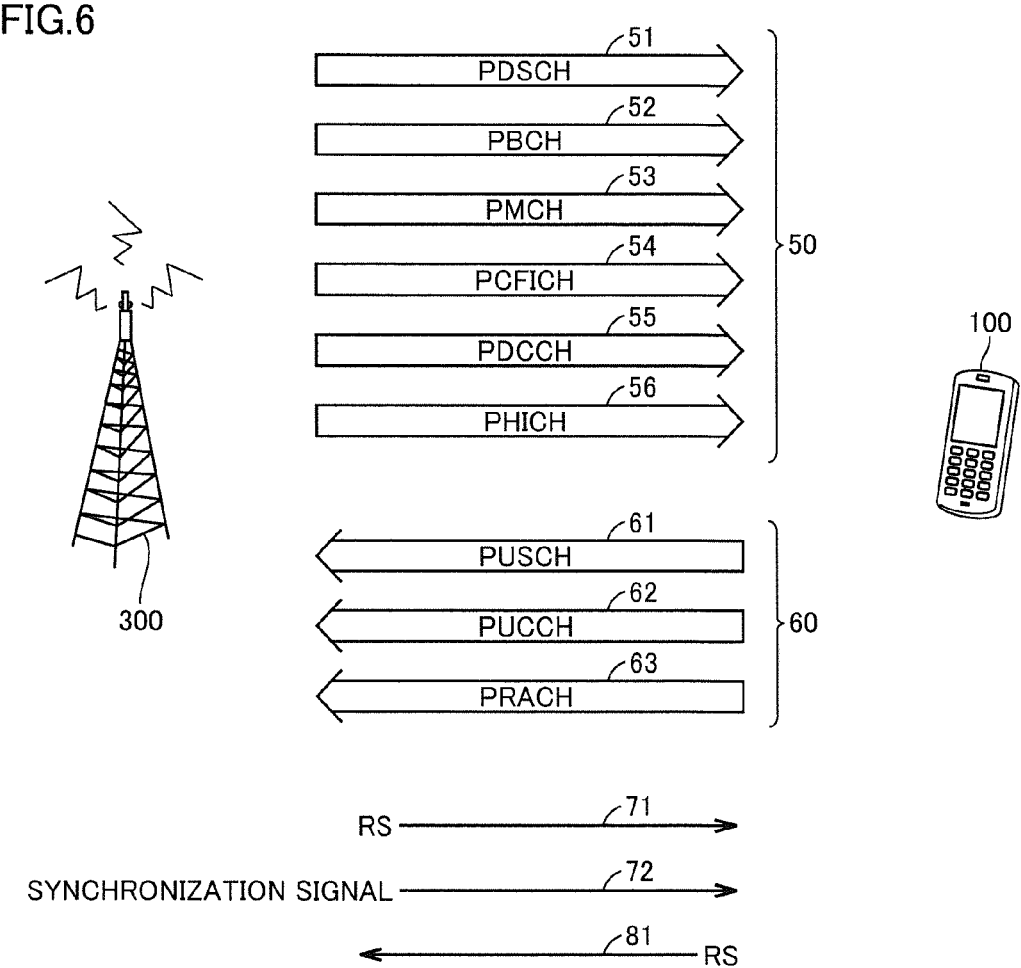
FIG. 6 is a diagram for illustrating physical layers in an LTE standard and an LTE-A standard.

With reference to FIG. 6, next, description will be given of physical layers in the LTE standard and the LTE-A standard. Physical channels (downlink and uplink) as well as physical signals (downlink and uplink) are defined as the physical layers in the LTE standard and the LTE-A standard.

[1. Physical Channel (Downlink)]

Six types of physical channels 51 to 56 are defined as downlink physical channel 50.

(1a) PDSCH (Physical Downlink Shared Channel)

User data and control data are mainly transmitted via a PDSCH.

(1b) PBCH (Physical Broadcast Channel)

Notification information is transmitted via a PBCH.

(1c) PMCH (Physical Multicast Channel)

Multicast data such as a broadcast are transmitted via a PMCH.

(1d) PCFICH (Physical Control Format Indicator Channel)

The number of symbols in a PDCCH is notified via a PCFICH.

(1e) PDCCH (Physical Downlink Control Channel)

Scheduling of the PDSCH and a PUSCH, TPC (Transmission Power Control) commands, and the like are transmitted via a PDCCH.

(1f) PHICH (Physical Hybrid ARQ Indicator Channel)

The ACK/NACK of a HARQ (Hybrid Automatic Repeat reQuest) to the PUSCH is transmitted via a PHICH.

[2. Physical Channel (Uplink)]

Three types of physical channels 61 to 63 are defined as uplink physical channel 60.

(2a) PUSCH (Physical Uplink Shared Channel)

User data and control data are mainly transmitted via the PUSCH.

(2b) PUCCH (Physical Uplink Control Channel)

The ACK/NACK of a HARQ to the PDSCH, CQI (Channel Quality Information), PMI (Precoding Matrix Indication), RI (Rank Indication) and the like are transmitted via a PUCCH.

(2c) PRACH (Physical Random Access Channel)

A random access preamble is transmitted via a PRACH.

[3. Physical Signal (Downlink)]

Two types of physical signals 71 and 72 are defined as the downlink physical signal.

(3a) RS (Reference Signal)

An RS is used for channel estimation and CQI measurement.

(3b) Synchronization Signal

A synchronization signal is used for a cell search to be described later.

[4. Physical Signal (Uplink)]

One physical signal 73 is defined as the uplink physical signal.

(4a) RS (Reference Signal)

An RS is used for channel estimation and CQI measurement.

E. CoMP in LTE-A Standard

The LTE-A standard is allowed to carry out coordinated multiple point transmission and reception (CoMP) which is a coordination mode in which two or more of the LTE-A base stations 300 establish communication with mobile station 100 in coordination with each other. As such a CoMP standard, at this time, the following matters are proposed.

(e1. Down Link CoMP)

Currently, the following two types of methods are mainly under review as a method using the CoMP in a down link.

Figure 7:
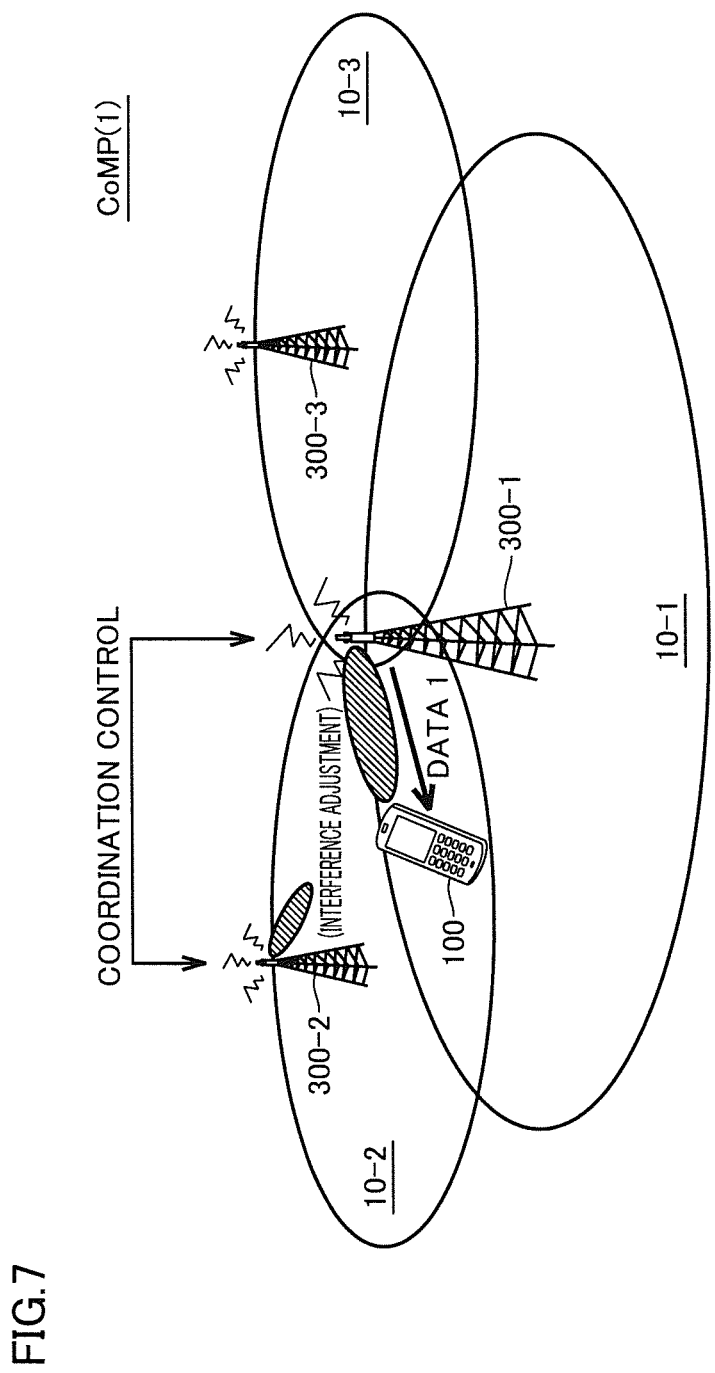
FIG. 7 is a diagram for illustrating CoMP operations in LTE-A (part 1).
Figure 8:
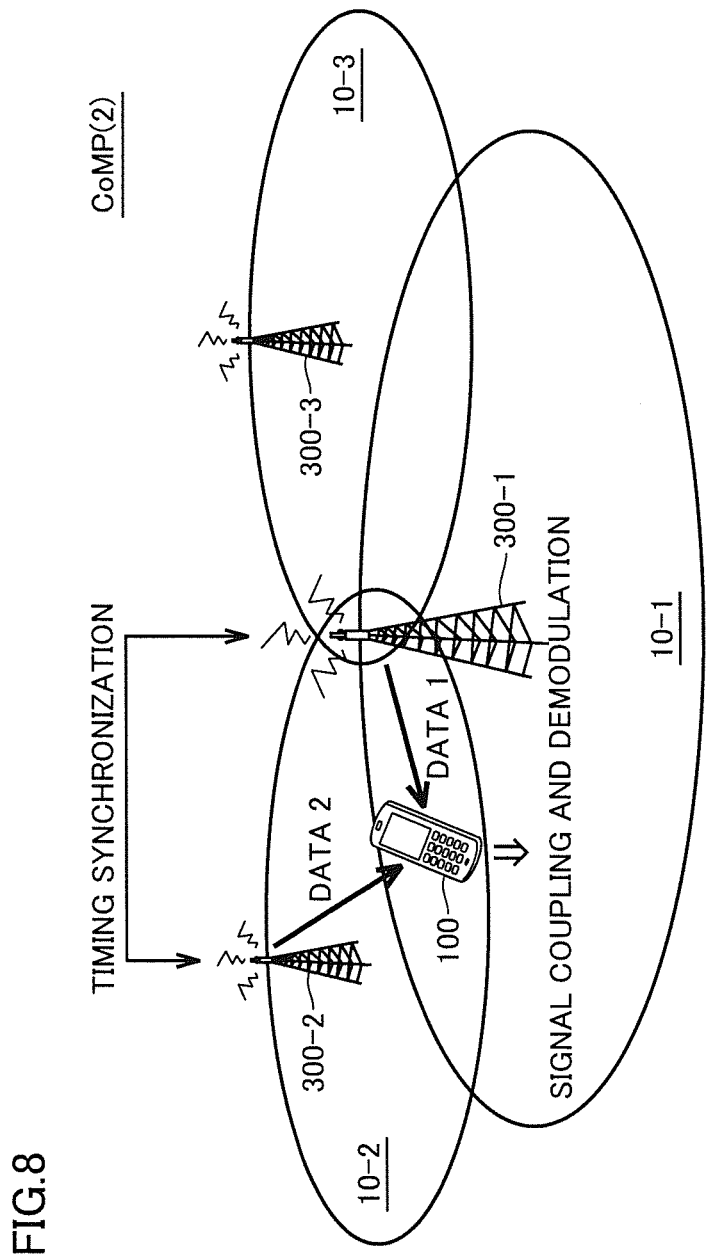
FIG. 8 is a diagram for illustrating CoMP operations in the LTE-A (part 2).

FIGS. 7 and 8 are diagrams for illustrating CoMP operations in the LTE-A.

A first method is a method for reducing interference. In the first method, a mobile station communicates with a base station in a one-to-one correspondence as in the LTE. However, a plurality of adjoining base stations shares information to perform scheduling and beamforming in coordination with each other.

As shown in FIG. 7, for example, consideration is given to a case where mobile station 100 is located at a cell edge between cell 10-1 and cell 10-2. In this case, mobile station 100 is capable of receiving a radio signal from base station 300-1 in cell 10-1 and a radio signal from base station 300-2 in cell 10-2. Therefore, when the signal from one base station 300 is received and, simultaneously, the signal from the other base station is received, the received signal acts as an interference source.

In the CoMP according to the first method, hence, base station 300-1 and base station 300-2 control signal transmission timings and radio wave transmission ranges in coordination with each other to reduce interference against mobile station 100.

Moreover, a second method is different from the LTE and is a method for improving reception quality in such a manner that a plurality of base stations simultaneously transmits signals to one mobile station and the mobile station couples and demodulates these signals.

With reference to FIG. 8, for example, consideration is given to a case where mobile station 100 is located at the cell edge between cell 10-1 and cell 10-2 as in the case in FIG. 7. In this case, mobile station 100 is capable of receiving a radio signal from base station 300-1 in cell 10-1 and a radio signal from base station 300-2 in cell 10-2. In the CoMP according to the second method, hence, base station 300-1 and base station 300-2 synchronize signal transmission timings in coordination with each other to transmit different kinds of data (data 1 and data 2) to mobile station 100, respectively. Thus, it is possible to increase a down link speed between base station 300 and mobile station 100.

(e2. Up Link CoMP)

As a method using the CoMP in an up link, there has been proposed and studied a method for improving reception quality in such a manner that the plurality of base stations 300 receives signals from mobile station 100 and then couples theses signals.

(e3. CoMP Starting Method)

Next, description will be given of one example of the method for starting the CoMP in the LTE-A.

Figure 9:
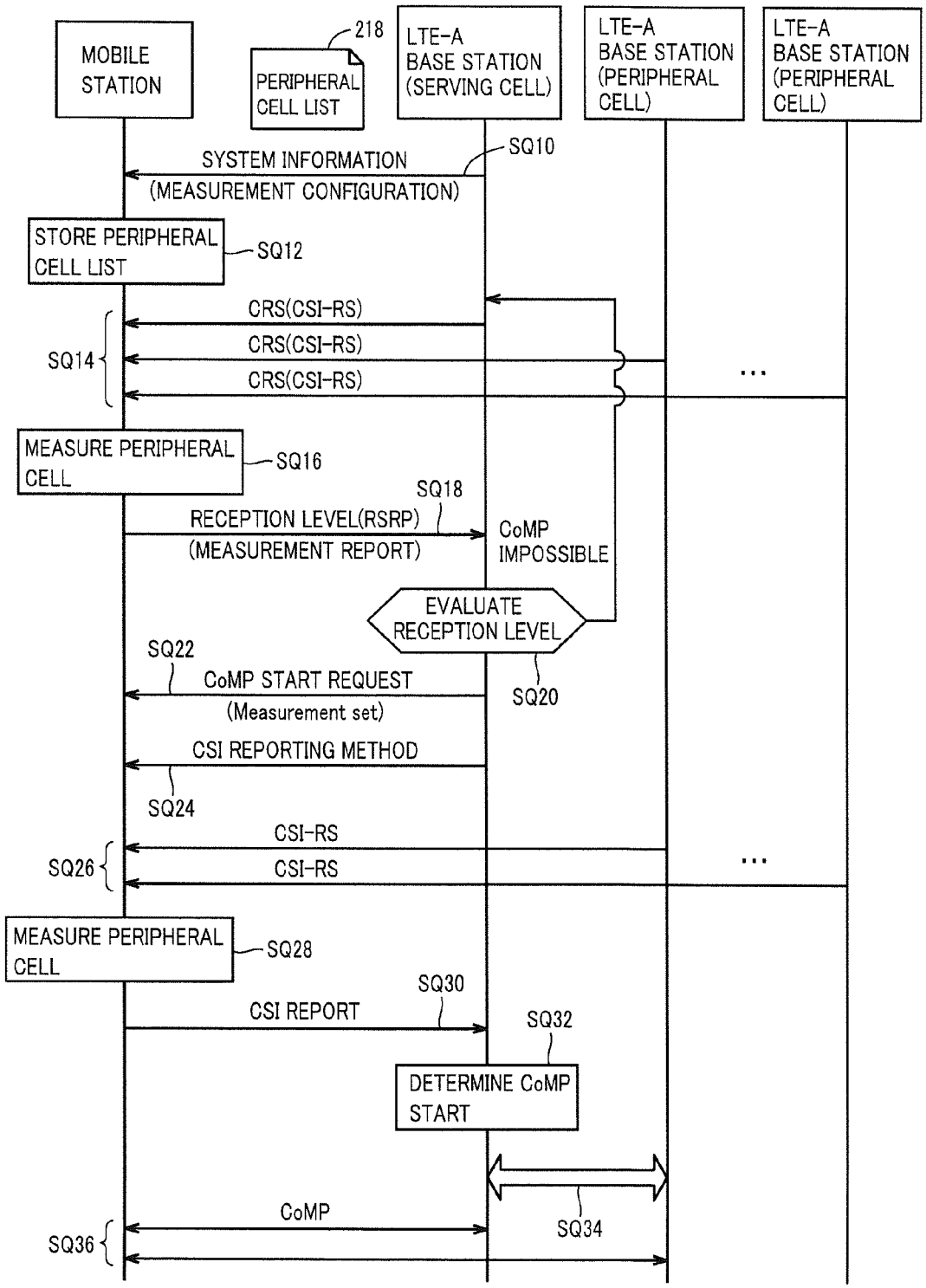
FIG. 9 is a sequence diagram showing exemplary operations of a process on starting in the LTE-A.

FIG. 9 is a sequence diagram showing exemplary operations of a process on starting in the LTE-A.

In the LTE, a mobile station measures peripheral cells of a cell where the mobile station exists, on the basis of information provided from a base station (serving cell). The information provided from the base station includes peripheral cell list 218. This information is transmitted from the base station to the mobile station via a broadcast channel or a dedicated channel (PDSCH/downlink shared channel). Herein, peripheral cell list 218 includes information for causing an offset on the basis of cell ID and reception level.

Namely, the base station (serving cell) transmits the information including peripheral cell list 218 to the mobile station (sequence SQ10). The mobile station stores peripheral cell list 218 included in the received information (sequence SQ12).

As disclosed in Non-Patent Literature 2, in the case where the information to be provided from the base station is transmitted to the mobile station via the broadcast channel, peripheral cell list 218 is included in a SYSTEM INFORMATION message. When the mobile station receives the SYSTEM INFORMATION message including the peripheral cell list, the mobile station stores the received peripheral cell list in the memory thereof.

Alternatively, in the case where the information to be provided from the base station is transmitted to the mobile station via the dedicated channel, the peripheral cell list is included in a MEASUREMENT CONFIGURATION message. When the mobile station receives the MEASUREMENT CONFIGURATION message including the peripheral cell list, the mobile station stores the received peripheral cell list in the memory thereof.

The base station prepares a new peripheral cell list and transmits a MEASUREMENT CONFIGURATION message, thereby updating the peripheral cell list even when the mobile station is under communication. On the other hand, when the mobile station receives the MEASUREMENT CONFIGURATION message, the mobile station measures reception level (Reference Signal Received Power: hereinafter, abbreviated as "RSRP") and radio quality (Reference Signal Received Quality: hereinafter, abbreviated as "RSRQ") for the cell in the peripheral cell list included in the MEASUREMENT CONFIGURATION message. Then, the mobile station transmits required information to the base station through a MEASUREMENT REPORT message, in accordance with the contents of the MEASUREMENT CONFIGURATION message.

Non-Patent Literature 3 discloses a typical procedure in the case of starting the CoMP. More specifically, Non-Patent Literature 3 discloses a method of carrying out the CoMP by feeding back a report (Reporting) from a mobile station.

Using a CRS (Cell-specific Reference Signal) or a CSI-RS (Channel State/Statistical Information-Reference Signal) to be transmitted by the base station, first, the mobile station measures the RSRP of each cell (sequence SQ16). Namely, each of the base station in the serving cell and the base station in the peripheral cell transmits a CRS or a CSI-RS in a cyclic manner or an event-like manner (sequence SQ14).

The mobile station transmits the measured value of the RSRP of each cell to the base station in the serving cell through the MEASUREMENT REPORT message (sequence SQ18). The base station determines whether or not the value of the RSRP on the cell (peripheral cell) other than the serving cell exceeds a predetermined threshold value (sequence SQ20).

When the value of the RSRP of the cell other than the serving cell does not exceed the predetermined threshold value, the base station does not perform a switching process to a CoMP Mode. As the result, the process corresponding to sequences SQ14 to SQ18 is performed repeatedly.

On the other hand, when the value of the RSRP of the cell other than the serving cell exceeds the predetermined threshold value, the base station determines that the CoMP should be performed, and then transmits a CoMP start request designating a CoMP reporting set and information of a CSI (Channel State/Statistical Information) reporting method to the mobile station (sequences SQ22, SQ24).

The information of the CSI reporting method, which is to be transmitted, is a request for starting the CoMP which is a coordination mode, and includes a method of reporting a result of measurement for the respective base stations to any one of the base stations. Namely, the information of the method of reporting includes designation of a communications standard for transmitting information of each channel measured by the mobile station.

Herein, the LTE-A specifies that the peripheral cells can be classified into a plurality of categories. Therefore, a peripheral cell performing measurement of reception level (RSRP) and radio quality (RSRQ) required for carrying out a handover and cell reselection is defined as a "Measurement set", and a peripheral cell having a possibility to carry out the CoMP is defined as a "CoMP reporting set". The CoMP reporting set is required to measure the RSRP and the RSRQ and, additionally, to report CSI required for carrying out the CoMP.

Figure 10:
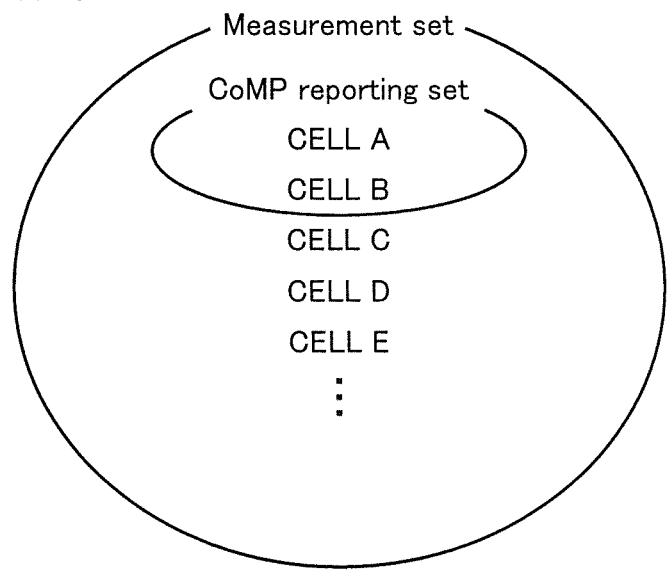
FIG. 10 is a diagram showing a relation between a Measurement set and a CoMP reporting set in the LTE-A.

As shown in FIG. 10, the range of the Measurement set is wider than the range of the CoMP reporting set, and the cell group of the CoMP reporting set is involved in the cell group of the Measurement set.

With reference to FIG. 9 again, each of the base stations in the peripheral cells transmits the CSI-RS in a cyclic manner or an event-like manner (sequence SQ26), and the mobile station measures the channel of the CoMP reporting set, using the CSI-RS (sequence SQ28), and transmits the value of the CSI by the notified CSI reporting method (sequence SQ30). Then, the base station determines whether or not communication should be established using one of the two types of CoMP described above, on the basis of a communication status with a different user, and the like (sequence SQ32). Namely, the base station selects any one of a plurality of modes (CoMP Mode) in which the two or more base stations are capable of establishing communication in coordination with each other, on the basis of a result of measurement for the two or more base stations.

Finally, when the base station determines that communication should be established using any one of the two types of CoMP, the base station exchanges required data with a different base station (sequence SQ34), and then starts to establish the communication based on the CoMP (sequence SQ36).

F. Soft Handover (SHO) in W-CDMA Standard

Next, description will be given of a soft handover (hereinafter, abbreviated as "SHO") in the W-CDMA standard. Also in the W-CDMA standard of which the service is now provided, an operation of one mobile station communicating with a plurality of base stations is specified by the 3GPP, and this operation corresponds to a SHO. However, the SHO is different from the foregoing CoMP, and the plurality of base stations transmits the same data. Namely, the SHO is parallel-like radio communication between the mobile station and the two or more base stations.

Figure 11:
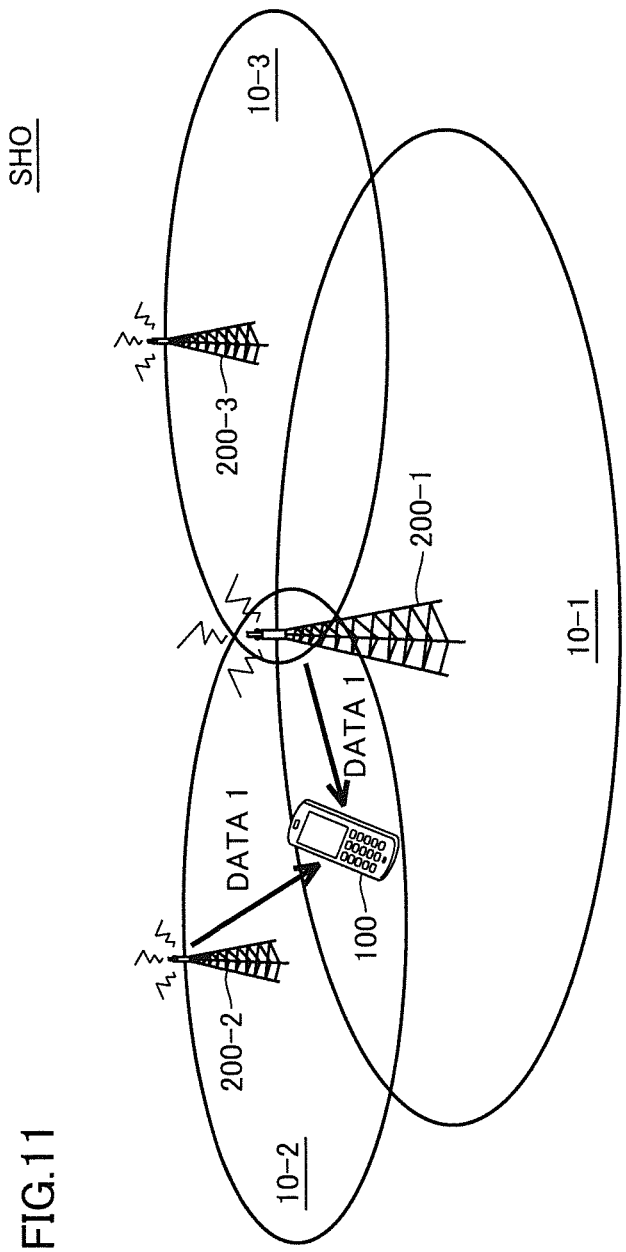
FIG. 11 is a diagram for illustrating SHO operations in W-CDMA.

FIG. 11 is a diagram for illustrating SHO operations in the W-CDMA. As shown in FIG. 11, for example, consideration is given to a case where mobile station 100 is located at a cell edge between adjoining cells 10-1 and 10-2. In this case, mobile station 100 is capable of receiving a radio signal from base station 200-1 in cell 10-1 and a radio signal from base station 200-2 in cell 10-2. In the SHO, hence, mobile station 100 receives a signal to be transmitted from each of base station 200-1 and base station 200-2.

Herein, in the W-CDMA standard, a plurality of communication methods is specified as follows.
(1) DCH (Dedicated Channel) Approach
  A DPDCH (Dedicated Physical Data Channel) is used as a physical channel upon transmission of user data.
(2) HSDPA (High Speed Downlink Packet Access) Approach
  An HS-DSCH (High Speed Downlink Shared Channel) is used as a physical channel upon transmission of downlink data.
(3) HSDPA (High Speed Uplink Packet Access) Approach
  An E-DCH (Enhanced Dedicated Channel) is used as a physical channel upon transmission of uplink data.

In any of the foregoing approaches, a DPCCH (Dedicated Physical Control Channel) is used as a physical channel upon transmission of control data.

With regard to the foregoing physical channels, the DPDCH, the E-DCH and the DPCCH are capable of performing the SHO, but the HS-DSCH is incapable of performing the SHO. Namely, data to be transmitted via the HS-DSCH is transmitted from one base station. Therefore, in the case of using the HS-DSCH as the physical channel upon transmission of the downlink data as in the HSDPA standard, the user data are transmitted from one base station and the control data are transmitted from the plurality of base stations.

G. Handover to Different System in W-CDMA Standard

In the W-CDMA standard, it is possible to perform a handover (Inter-RAT handover) to a different system. In this case, a period of time during which no data communication is established, namely, Compressed Mode is set, and cells in the different system are searched during this period of time. Namely, in the Compressed Mode, radio communication in accordance with the W-CDMA standard is temporarily suspended, and measurement for the different communication system is carried out.

Figure 12:
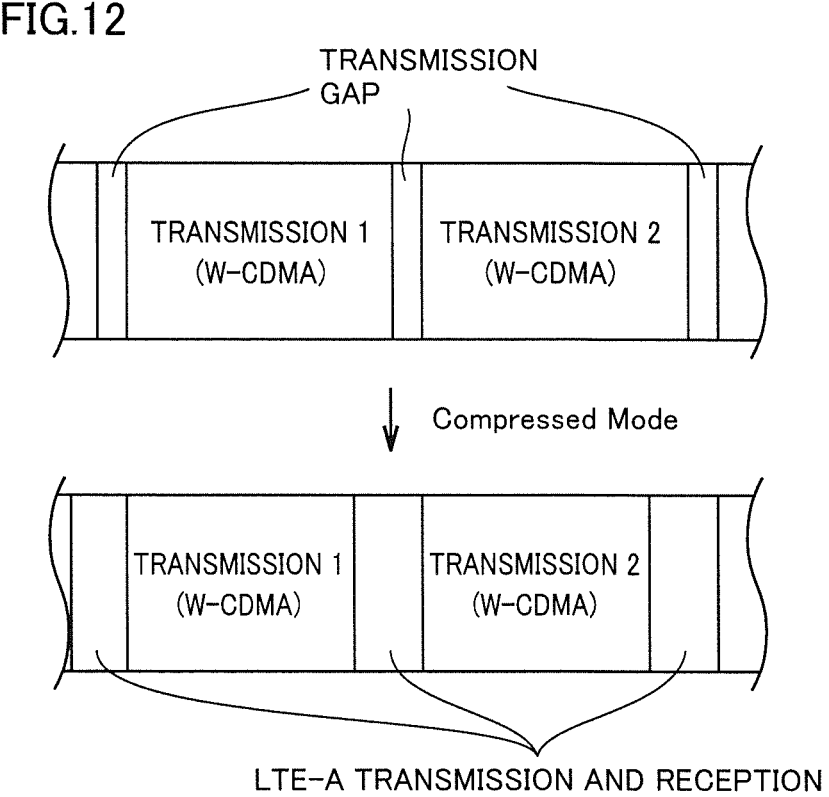
FIG. 12 is a diagram for illustrating a Compressed Mode in the W-CDMA.

As a method for implementing the Compressed Mode, the following methods are specified.
(1) SF/2: An approach of increasing a transmission rate at a specific section in a slot of a transmission gap to set a section in which no data communication is established
(2) higher layer scheduling: An approach of determining a TFC (Transport Format Set) in accordance with the number of bits which can be transmitted in a slot other than a transmission gap FIG. 12 is a diagram for illustrating the Compressed Mode in the W-CDMA. As shown in FIG. 12, in a case where a transmission frame at a certain time interval is defined, a transmission gap between a preceding transmission frame and a subsequent transmission frame is extended, and a transmission and reception section in a different system (the LTE-A standard in the present embodiment) is provided.

With reference to FIG. 5 again, when the Compressed Mode is turned ON, on the basis of a request from the base station, mobile station 100 suspends the transmission (or reception) of data in the W-CDMA system during a designated gap period. Namely, switch 136 of transmission module 130 and switch 146 of reception module 140 are timely controlled, so that LTE-A communication is validated only during a period of the transmission gap and the LTE-A base station is searched.

H. Inter-RAT Handover Process

The Related Art

Next, description will be given of exemplary operations in a case where a certain mobile station performs a handover (Inter-RAT handover) to the LTE-A system during communication in the W-CDMA system so as to start to perform the CoMP, on the basis of the foregoing operations of the process.

Figure 13:
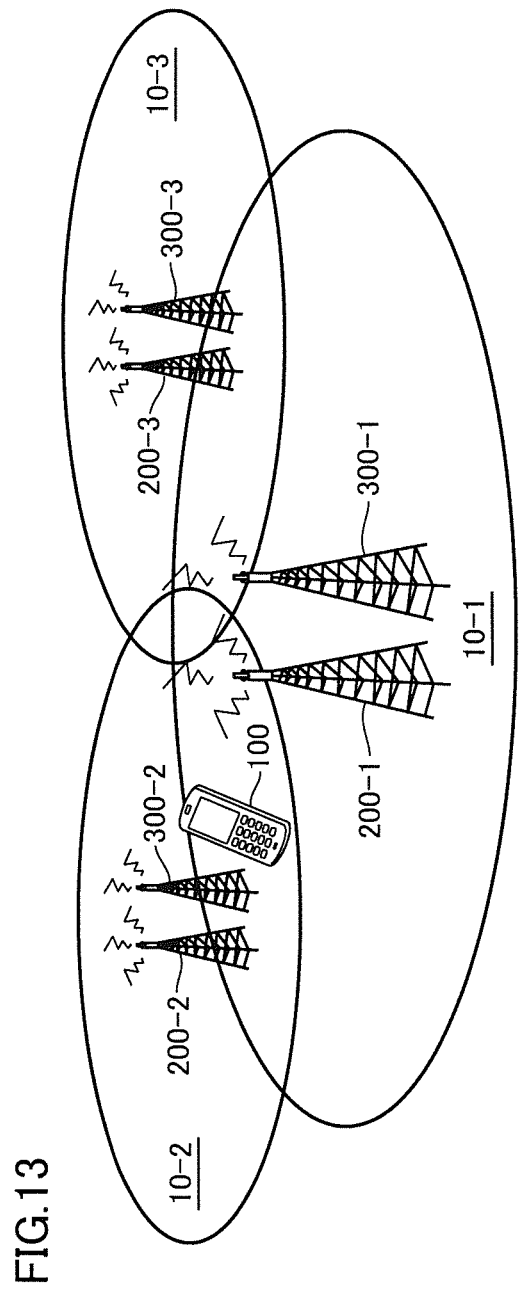
FIG. 13 is a diagram schematically showing a positional relation in a case of a handover to a system in accordance with the LTE-A during communication established by a mobile station in the system in accordance with the W-CDMA.
Figure 14:
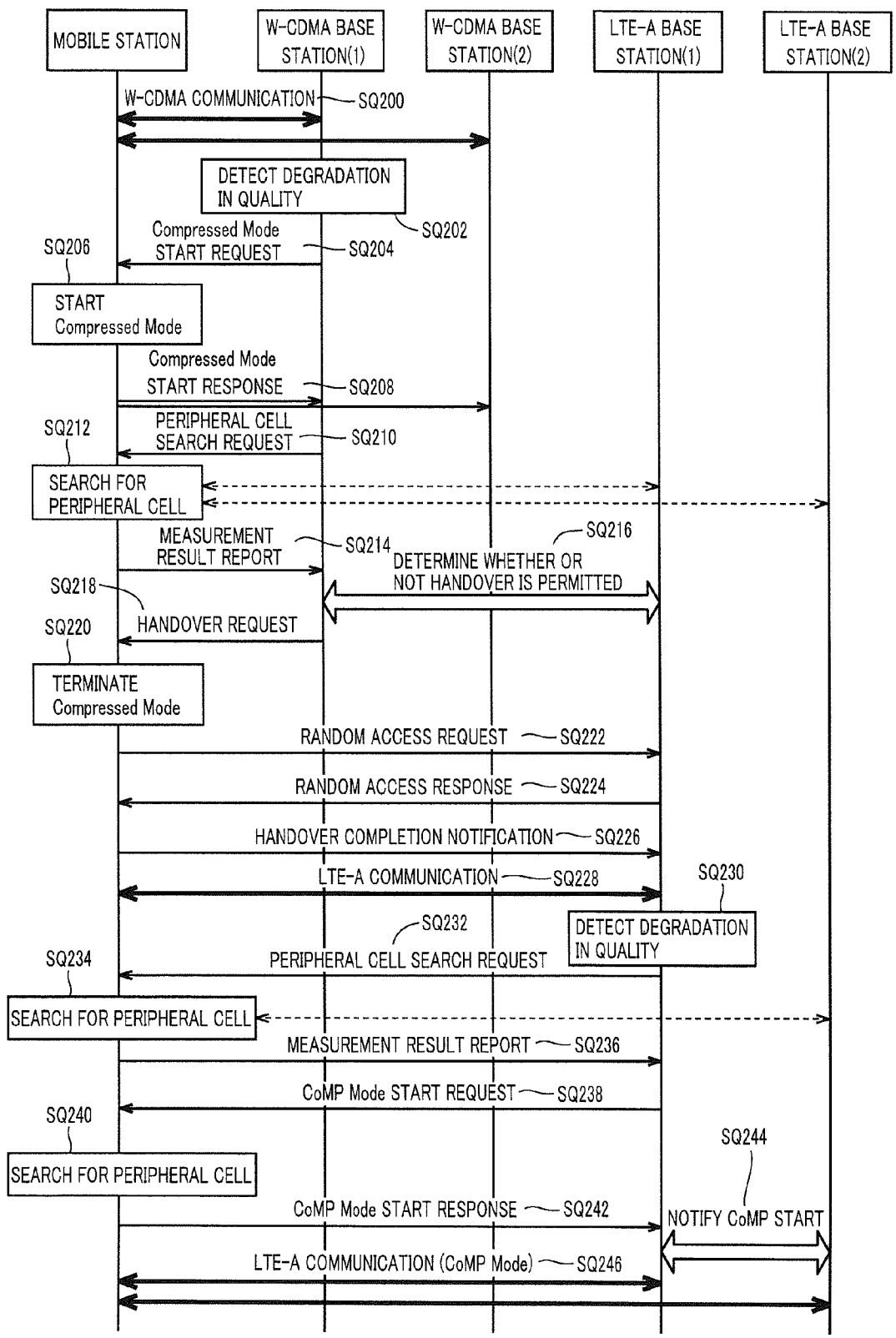
FIG. 14 is a sequence diagram showing exemplary operations of a handover process from a W-CDMA standard to an LTE-A standard in the embodiment of the present invention.

FIG. 13 is a diagram schematically showing a positional relation in a case where the mobile station performs a handover to the LTE-A system during the communication in the W-CDMA system. FIG. 14 is a sequence diagram showing exemplary operations of the handover process from the W-CDMA standard to the LTE-A standard in the embodiment of the present invention.

With reference to FIG. 13, first, consideration is given to a case where mobile station 100 compatible with both the W-CDMA standard and the LTE-A standard is located at a cell edge between adjoining cells 10-1 and 10-2. It is assumed herein that base station 200-1 in accordance with the W-CDMA standard and base station 300-1 in accordance with the LTE-A standard are installed in cell 10-1, and the base stations 200-1 and 300-1 are substantially identical in coverage (service providing range) with each other. Likewise, it is assumed herein that base station 200-2 in accordance with the W-CDMA standard and base station 300-2 in accordance with the LTE-A standard are installed in cell 10-2, and base stations 200-2 and 300-2 are substantially identical in coverage with each other.

Namely, base station 200-1 in accordance with the W-CDMA standard and base station 300-1 in accordance with the LTE-A standard are disposed at substantially the same place, and base station 200-2 in accordance with the W-CDMA standard and base station 300-2 in accordance with the LTE-A standard are also disposed at substantially the same place. Moreover, base station 200-1 in accordance with the W-CDMA standard and base station 300-1 in accordance with the LTE-A standard are substantially equal in cell diameter to each other, and base station 200-2 in accordance with the W-CDMA standard and base station 300-2 in accordance with the LTE-A standard are substantially equal in cell diameter to each other.

Under the situation shown in FIG. 13, consideration is given to a case where mobile station 100 performs a handover (Inter-RAT handover) to the LTE-A system in the state of establishment of the communication with the plurality of base stations 200 in accordance with the W-CDMA standard.

It is assumed in the initial state that mobile station 100 establishes the communication in the SHO mode. Namely, it is assumed that mobile station 100 establishes parallel-like radio communication with base stations 200-1 and 200-2 in accordance with the W-CDMA standard.

It is assumed in the initial state that, with regard to mobile station 100, the reception quality from base station 200-1 in accordance with the W-CDMA standard is more favorable than the reception quality from base station 200-2 in accordance with the W-CDMA standard.

As a method by which base station 200 evaluates the reception quality, the reception level (Received Signal Code Power: RSCP) and the radio quality Ec/N0 (ratio of energy per modulating bit to noise spectral density) each reported from mobile station 100 may be used. Moreover, a method using uplink reception quality (Signal to Interference Ratio: SIR) may be adopted.

It is assumed herein that in a case of establishing the HSDPA communication as the W-CDMA standard, base station 200-1 in accordance with the W-CDMA standard is a serving cell for transmitting the HS-DSCH.

In the following description, base station 200-1 in accordance with the W-CDMA standard is represented as "W-CDMA base station (1)" in some instances and base station 200-2 in accordance with the W-CDMA standard is represented as "W-CDMA base station (2)" in some instances, in view of the illustrations in FIGS. 14 to 16. Moreover, base station 300-1 in accordance with the LTE-A standard is represented as "LTE-A base station (1)" in some instances and base station 300-2 in accordance with the LTE-A standard is represented as "LTE-A base station (2)" in some instances.

It is assumed first that mobile station 100 establishes communication in accordance with the W-CDMA standard (SHO mode) with W-CDMA base station (1) and W-CDMA base station (2) (sequence SQ200).

It is assumed as described above that W-CDMA base station (1) detects degradation in quality (SIR: Signal to Interference Ratio) of uplink data (DCH) during the communication with mobile station 100 located in the cell where W-CDMA base station (1) is installed (sequence SQ202). Then, when W-CDMA base station (1) determines that it is preferred to establish communication in the LTE-A system, on the basis of an event such as the degradation in quality of the uplink data, W-CDMA base station (1) transmits a Compressed Mode start request to mobile station 100 (sequence SQ204).

When mobile station 100 receives the Compressed Mode start request, mobile station 100 starts the Compressed Mode (sequence SQ206). Next, mobile station 100 transmits a Compressed Mode start response to W-CDMA base station (1) and W-CDMA base station (2) (sequence SQ208).

Next, using a Measurement Control message, W-CDMA base station (1) transmits a peripheral cell search request to the mobile station (sequence SQ210). When mobile station 100 receives the peripheral cell search request, mobile station 100 starts to search for the requested peripheral cell (sequence SQ212). Namely, mobile station 100 measures the reception level (RSRP) and radio quality (RSRQ) of the peripheral cell to determine whether or not a requested condition is satisfied. In a case where the peripheral cell satisfying the requested condition exists, mobile station 100 transmits a result of the measurement to W-CDMA base station (1), using the Measurement Report message (sequence SQ214).

It is assumed herein that LTE-A base stations (1) and (2) are a target to be searched and the reception level (RSRP) or radio quality (RSRQ) measured for the base station satisfies the condition that a handover should be performed.

W-CDMA base station (1) (or radio network controller 40 shown in FIG. 3) determines whether or not the handover from the W-CDMA standard to the LTE-A standard is permitted, between W-CDMA base station (1) (or radio network controller 40 shown in FIG. 3) and LTE-A base stations (1) and (2) (or radio network controller 44 shown in FIG. 3), on the basis of the result of the measurement received from mobile station 100 (sequence SQ216).

When it is determined that the handover from the W-CDMA standard to the LTE-A standard should be permitted, W-CDMA base station (1) transmits a handover request to mobile station 100 (sequence SQ218).

When mobile station 100 receives the handover request, mobile station 100 terminates the Compressed Mode (sequence SQ220). It is assumed herein that LTE-A base station (1) is designated as a serving cell. Then, mobile station 100 transmits a random access request to LTE-A base station (1) requested as a destination of the handover (sequence SQ222). When LTE-A base station (1) receives the random access request, LTE-A base station (1) transmits a random access response to mobile station 100 (sequence SQ224). When mobile station 100 receives the random access response, mobile station 100 transmits a handover completion notification to LTE-A base station (1) (sequence SQ226).

The foregoing procedure corresponds to the handover process from the W-CDMA system to the LTE-A system. Next, communication in accordance with the LTE-A standard is started. In the communication in accordance with the LTE-A standard, the CoMP is started depending on statuses.

Namely, it is assumed that, upon completion of the handover process from the W-CDMA system to the LTE-A system, communication in accordance with the LTE-A standard is established between mobile station 100 and LTE-A base station (1) (sequence SQ228). Subsequently, it is assumed that LTE-A base station (1) detects degradation in quality of uplink data during communication with mobile station 100 located in the cell where LTE-A base station (1) is installed (sequence SQ230). Then, when LTE-A base station (1) determines that the CoMP should be carried out, on the basis of an event such as the degradation in quality of the uplink data, LTE-A base station (1) transmits a peripheral cell search request to mobile station 100, using a Measurement Control message (sequence SQ232).

During the communication in accordance with the LTE-A standard, mobile station 100 reports the reception level (RSRP) and the radio quality (RSRQ) to the LTE-A base station every predetermined cycle or predetermined event, and the LTE-A base station in the serving cell is also capable of determining degradation in communication quality, on the basis of this report.

When mobile station 100 receives the Measurement Control message, mobile station 100 starts to search for the requested peripheral cell (sequence SQ234). Namely, mobile station 100 measures the reception level (RSRP) and radio quality (RSRQ) of the peripheral cell to determine whether or not a requested condition is satisfied. Then, in a case where a peripheral cell satisfying the requested condition exists, mobile station 100 transmits a result of the measurement to LTE-A base station (1), using a Measurement Report message (sequence SQ236).

When LTE-A base station (1) receives the Measurement Report message, LTE-A base station (1) determines whether or not to switch to the CoMP Mode. Namely, LTE-A base station (1) determines whether or not the reception level (RSRP) or radio quality (RSRQ) of the different cell exceeds a certain threshold value, thereby determining whether or not the CoMP should be carried out.

When LTE-A base station (1) determines that the CoMP should be carried out, LTE-A base station (1) transmits a CoMP Mode start request including a cell group in a CoMP reporting set to the mobile station (sequence SQ238). When mobile station 100 receives the CoMP Mode start request, mobile station 100 measures a channel in the CoMP reporting set, on the basis of a CSI-RS from each cell included in the CoMP reporting set (sequence SQ240). Then, mobile station 100 transmits a CoMP Mode start response to LTE-A base station (1) (sequence SQ242). Herein, mobile station 100 transmits a CSI to LTE-A base station (1) by the previously notified CSI reporting method.

LTE-A base station (1) determines which one of the foregoing two types of CoMP should be carried out, in accordance with a communication status with a different user, and the like and notifies the different LTE-A base station carrying out the CoMP of information required for carrying out the selected CoMP (sequence SQ244). It is assumed herein that LTE-A base station (1) and LTE-A base station (2) carry out the CoMP with mobile station 100.

As described above, upon completion of the CoMP Mode starting process, mobile station 100 starts to establish communication in accordance with the LTE-A standard with LTE-A base station (1) and/or LTE-A base station (2) in the CoMP Mode (sequence SQ246).

I. Problems

As described above, in order to perform a handover (Inter-RAT handover) from the cell in the W-CDMA system to a cell in a different system, it is required to detect the cell after the handover, using the Compressed Mode.

In the SF/2 which is one example of the Compressed Mode, electric power which is about twice as large as usual is transmitted for increasing a transmission rate. Consequently, there arises a problem in that electric power consumed in the mobile station increases and the mobile station serves as an interference source against a different mobile station. In the higher layer scheduling which is one example of the Compressed Mode, moreover, there arises a problem in that an amount of data which can be transmitted per unit time is reduced. Accordingly, it is preferred that a period of time during which the Compressed Mode is ON is reduced as much as possible.

On the other hand, if a fact that it is preferred to carry out the CoMP in the LTE-A is previously estimated in the case of performing the handover (Inter-RAT handover) from the W-CDMA system to the LTE-A system, it is possible to reduce errors and improve communication quality in such a manner that the CoMP is carried out immediately after the handover. In order to carry out the CoMP immediately after the handover, as described above, it is preferred to detect all the LTE-A base stations communicable with the mobile station and, then, to start the CoMP after the handover in some instances.

However, the detection of all the LTE-A base stations communicable with the mobile station requires an extra time for a searching process. Consequently, there arises a problem in that a period of time for maintaining the Compressed Mode at an ON state becomes relatively long.

Hence, it is one object of the present embodiment to provide an Inter-RAT handover method capable of reducing a period of time for the Compressed Mode as much as possible at the time of the handover from the W-CDMA system to the LTE-A system and improving communication quality in the LTE-A after the handover as much as possible.

J. Inter-RAT Handover Process

The Present Embodiment

As described above, under the environment that the W-CDMA base station and the LTE-A base station are installed in the same cell, there is a high possibility that, as long as mobile station 100 carries out the SHO in accordance with the W-CDMA standard, mobile station 100 is capable of carrying out the CoMP, using LTE-A base station 300 installed in the same place as W-CDMA base station 200 concerned with the SHO, after carrying out the handover (Inter-RAT handover) from the W-CDMA system to the LTE-A system.

In the present embodiment, therefore, in the case where the SHO in accordance with the W-CDMA standard is carried out immediately before the Inter-RAT handover, the base station concerned with the SHO is designated as the CoMP Reporting Set, so that determination as to where or not the CoMP can be carried out after the Inter-RAT handover is made for a short period of time. With reference to the following sequence diagrams, description will be given of more specific operations.

Figure 15:
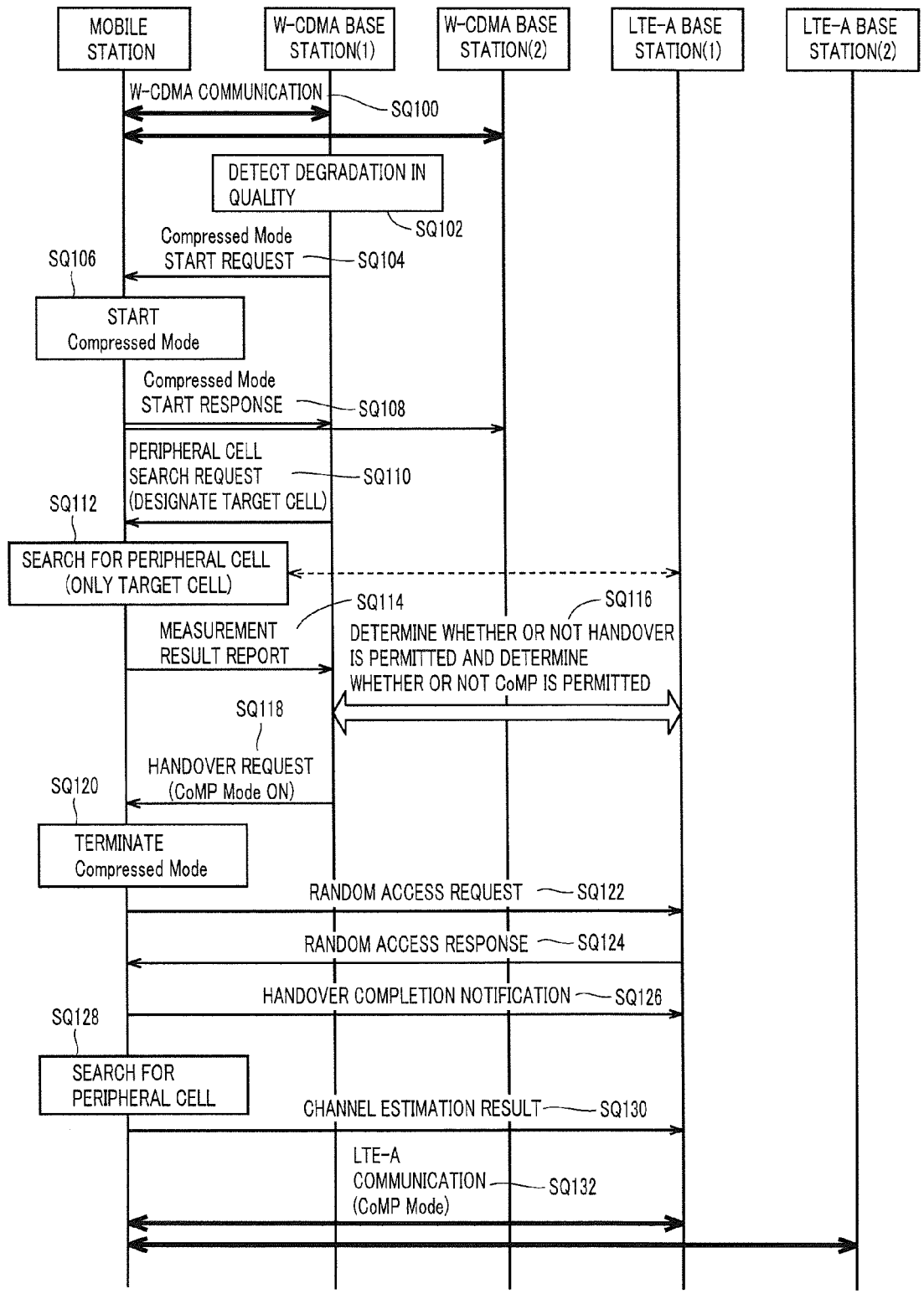
FIG. 15 is a sequence diagram showing exemplary operations of a handover process (CoMP validation) from the W-CDMA standard to the LTE-A standard in the embodiment of the present invention.

FIG. 15 is a sequence diagram showing exemplary operations of a handover process from the W-CDMA standard to the LTE-A standard (CoMP validation) in the embodiment of the present invention. FIG. 16 is a sequence diagram showing exemplary operations of a handover process from the W-CDMA standard to the LTE-A standard (CoMP invalidation) in the embodiment of the present invention.

With reference to FIG. 15, first, it is assumed that mobile station 100 establishes communication in accordance with the W-CDMA standard with W-CDMA base station (1) and W-CDMA base station (2) (SHO mode) (sequence SQ100). Namely, it is assumed that parallel-like radio communication is started between mobile station 100 and W-CDMA base station (1) and W-CDMA base station (2).

As described above, it is assumed that W-CDMA base station (1) detects degradation in quality (SIR: Signal to Interference Ratio) of uplink data (DCH) during the communication with mobile station 100 located in the cell where W-CDMA base station (1) is installed (sequence SQ102).

Namely, W-CDMA base station (1) or W-CDMA base station (2) determines whether or not the handover from the W-CDMA standard to the LTE-A standard is required, on the basis of a result of the measurement for the W-CDMA base station measured by mobile station 100, during the period of the parallel-like radio communication between mobile station 100 and W-CDMA base station (1) and W-CDMA base station (2).

Then, when W-CDMA base station (1) determines that it is preferred to establish communication in accordance with the LTE-A system, on the basis of an event such as the degradation in quality of the uplink data, W-CDMA base station (1) transmits a Compressed Mode start request to mobile station 100 (sequence SQ104). When mobile station 100 receives the Compressed Mode start request, mobile station 100 starts a Compressed Mode (sequence SQ106). Subsequently, mobile station 100 transmits a Compressed Mode start response to W-CDMA base station (1) and W-CDMA base station (2) (sequence SQ108).

Subsequently, W-CDMA base station (1) transmits a peripheral cell search request to mobile station 100, using a Measurement Control message (sequence SQ110). Herein, W-CDMA base station (1) designates, as a cell to be searched, one of the LTE-A base stations responsive to the W-CDMA base stations currently concerned with the SHO with mobile station 100. In the example shown in FIG. 15, it is assumed that, out of LTE-A base station (1) responsive to W-CDMA base station (1) and LTE-A base station (2) responsive to W-CDMA base station (2), LTE-A base station (1) relative to W-CDMA base station (1) which is a serving cell is designated.

Namely, one LTE-A base station which is designated by the Measurement Control message as a target to be searched corresponds to an LTE-A base station correlated with a W-CDMA base station which is a serving cell in SHOs with two or more of the W-CDMA base stations.

When mobile station 100 receives the peripheral cell search request, mobile station 100 starts to search for only the requested peripheral cell (LTE-A base station (1) in the example shown in FIG. 15) (sequence SQ112). Namely, mobile station 100 measures reception level (RSRP) and radio quality (RSRQ) of the requested peripheral cell, and transmits a result of the measurement to W-CDMA base station (1), using a Measurement Report message (sequence SQ114).

Herein, since the Compressed Mode is ON in mobile station 100, mobile station 100 temporarily suspends the radio communication in accordance with the W-CDMA standard and establishes radio communication in accordance with the LTE-A standard.

As described above, during the period of the parallel-like radio communication between mobile station 100 and the two or more W-CDMA base stations, mobile station 100 designates the LTE-A base station correlated with one of the two or more W-CDMA base stations, temporarily suspends the radio communication in accordance with the W-CDMA standard, and requests to measure the designated LTE-A base station.

On the basis of the result of the measurement received from mobile station 100, W-CDMA base station (1) (or radio network controller 40 shown in FIG. 3) determines whether or not the handover from the W-CDMA standard to the LTE-A standard is permitted and whether or not the validation of the CoMP Mode is permitted, between W-CDMA base station (1) (or radio network controller 40 shown in FIG. 3) and LTE-A base stations (1) and (2) (or radio network controller 44 shown in FIG. 3) (sequence SQ116).

When it is determined that the handover from the W-CDMA standard to the LTE-A standard should be permitted and the CoMP Mode after the handover to the LTE-A should be validated, W-CDMA base station (1) transmits a handover request to mobile station 100 (sequence SQ118). Herein, the handover request includes a request for starting the CoMP Mode.

Namely, on the basis of the result of the measurement for the designated LTE-A base station (LTE-A base station (1) in the example shown in FIG. 15), W-CDMA base station (1) notifies mobile station 100 of the handover (Inter-RAT handover) from the W-CDMA standard to the LTE-A standard, and the two or more LTE-A base stations including the designated LTE-A base station notify mobile station 100 of a request for starting a coordination mode (CoMP) for establishing communication between the two or more LTE-A base stations and mobile station 100, in coordination with each other.

The request for starting the coordination mode, which is included in the handover request, includes information of a method of reporting the result of the measurement for the two or more LTE-A base stations to the LTE-A base station. More specifically, the information of the method of reporting for the LTE-A base station includes designation of a communication method for transmitting information of each channel measured by mobile station 100, such as a feedback format and a transmission cycle concerned with the LTE-A base station.

When mobile station 100 receives the handover request, mobile station 100 terminates the Compressed Mode (sequence SQ120). Namely, when mobile station 100 receives the notification of the handover from the W-CDMA standard to the LTE-A standard, mobile station 100 terminates the operation of temporarily suspending the radio communication in accordance with the W-CDMA standard.

Subsequently, mobile station 100 transmits a random access request to LTE-A base station (1) (sequence SQ122). When LTE-A base station (1) receives the random access request, LTE-A base station (1) transmits a random access response to mobile station 100 (sequence SQ124). When mobile station 100 receives the random access response, mobile station 100 transmits a handover completion notification to LTE-A base station (1) (sequence SQ126).

Then, mobile station 100 performs a process required for starting the CoMP Mode to start LTE-A communication (sequence SQ132).

More specifically, mobile station 100 starts to receive CSI-RSs from LTE-A base stations (1) and (2) (CoMP reporting set) designated in the method of reporting included in the information for turning the CoMP Mode in the handover request ON. Namely, when mobile station 100 receives the CoMP Mode start request, mobile station 100 measures the channel in the CoMP reporting set, on the basis of the CSI-RS from each cell included in the CoMP reporting set (sequence SQ128). Then, mobile station 100 feeds the estimation result of the channel measured on the basis of the received CSI-RS back to the LTE-A base stations (1) and (2), in accordance with the designated reporting method (feedback method) (sequence SQ130).

Herein, examples of the feedback method may include a transmission method using a PUSCH (uplink shared channel) in accordance with uplink user data and a transmission method using a PUCCH (uplink control channel) which is a shared channel.

LTE-A base stations (1) and (2) establish communication using one of the foregoing two types of CoMP. As described above, upon completion of the process of starting the CoMP Mode, mobile station 100 starts to establish communication in accordance with the LTE-A standard with LTE-A base station (1) and LTE-A base station (2) in the CoMP Mode (sequence SQ130).

Herein, as a method of selecting the type of CoMP, it is considered to select the type on the basis of a communication status with a different user, and the like. Typically, in a case where the current number of users exceeds a certain value or an amount of data in a predetermined section exceeds a predetermined threshold value as a result of evaluation of the communication status with the different user, mobile station 100 may adopt the first method for establishing the communication with only one LTE-A base station 300 rather than the plurality of LTE-A base stations 300. If not, mobile station 100 may adopt the second method.

Alternatively, it is also assumed that any of mobile station 100 and LTE-A base station 300 only has one of the functions of the foregoing two types of CoMP. In such a case, information about the function limitation is transmitted to the LTE-A base station upon registration of the position of the mobile station.

When the foregoing process is adopted, the LTE-A base station which is installed at the same place as at least one cell concerned with the SHO carried out immediately before is limited to a target of cell measurement in the case of performing the Inter-RAT handover from the W-CDMA system to the LTE-A system, so that the CoMP can be carried out without measuring the cells for the remaining LTE-A base stations. Namely, the LTE-A base station installed in the cell covered by the W-CDMA base station carrying out the SHO immediately before is set at the CoMP Reporting Set, and determination is made on the basis of the feedback about the setting. Thus, it is possible to reduce a period of time for the Compressed Mode at the time of the Inter-RAT handover and to carry out the CoMP immediately after the Inter-RAT handover.

Figure 16:
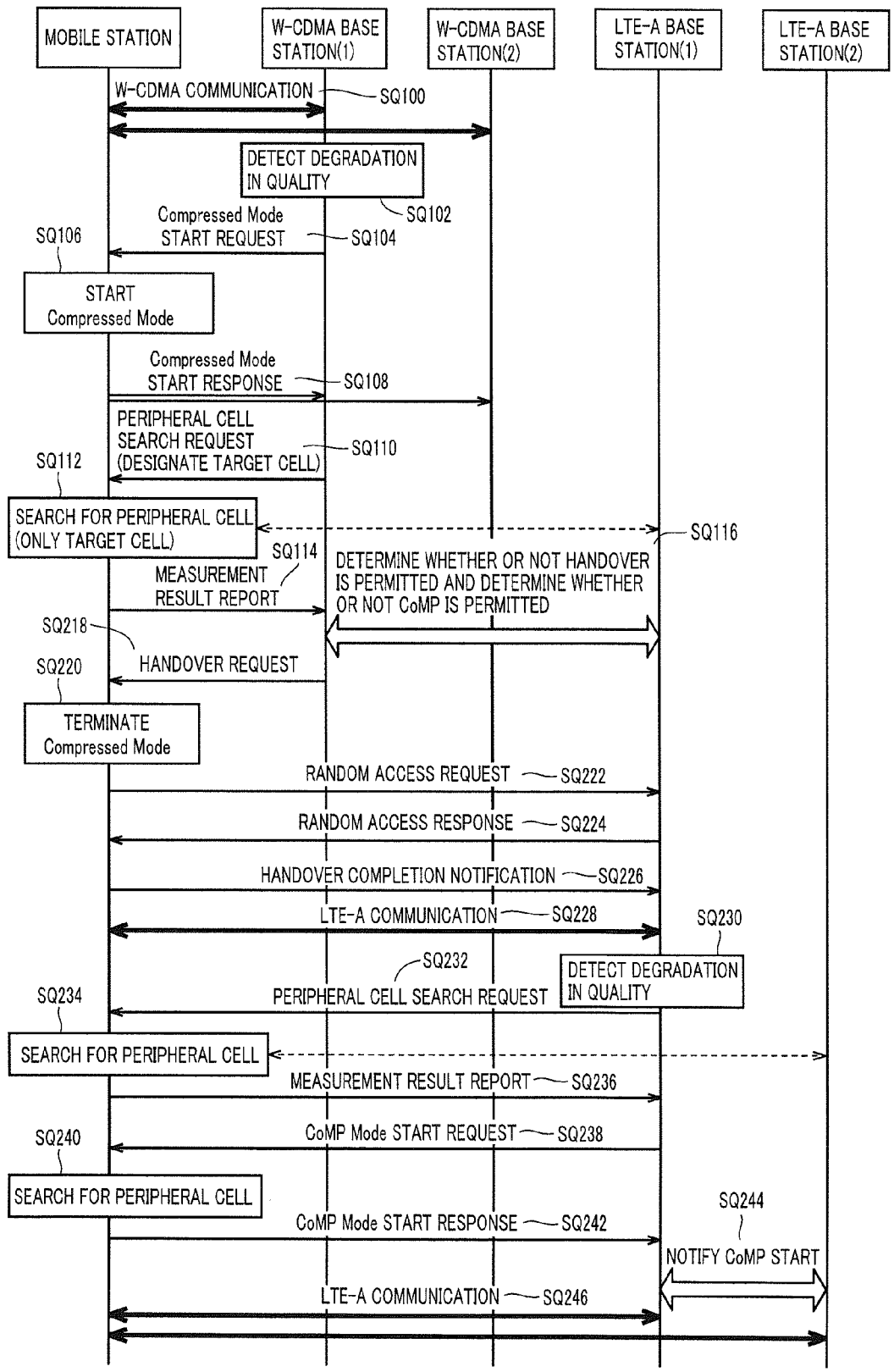
FIG. 16 is a sequence diagram showing exemplary operations of a handover process (CoMP invalidation) from the W-CDMA standard to the LTE-A standard in the embodiment of the present invention.

In sequence SQ116 shown in FIG. 15, when the CoMP cannot be validated because of any reason, a processing procedure shown in FIG. 16 is executed. With reference to FIG. 16, when it is determined in sequence SQ116 that the handover from the W-CDMA standard to the LTE-A standard is permitted, but the CoMP Mode after the handover to the LTE-A cannot be validated, W-CDMA base station (1) transmits a handover request not including a request for starting the CoMP Mode to mobile station 100 (sequence SQ218). When mobile station 100 receives the handover request, mobile station 100 terminates the Compressed Mode (sequence SQ220).

Thereafter, a process substantially corresponding to the sequences shown in FIG. 14 is executed. In the process shown in FIG. 16, sequences which are substantially identical with the sequences shown in FIG. 14 are denoted with the identical reference signs.

K. Other Embodiments (1) As described above, the process for the Inter-RAT handover in the present embodiment is directed to the predetermined conditions, i.e., (a) the cell range in accordance with W-CDMA standard is substantially identical with the cell range in accordance with the LTE-A standard and (b) the SHO (soft handover) in accordance with the W-CDMA standard is carried out immediately before the handover. Therefore, it may be possible to previously determine conditions, such as whether or not the Inter-RAT handover is required, whether or not the shape of the cell is applicable, and whether or not the SHO in accordance with the W-CDMA standard is carried out immediately before the handover, and then it may be possible to determine whether or not the sequences shown in FIG. 15 should be carried out or whether or not the sequences shown in FIG. 14 should be carried out.

(2) In the foregoing embodiment, the exemplary description is given to the case where one base station in accordance with each standard is installed in each cell, namely, two base stations (W-CDMA standard and LTE-A standard) are installed in each cell. However, it may be possible to divide one cell into a plurality of sectors and to carry out the foregoing method on the sector basis. Namely, each base station is provided with a plurality of antennas which are different in directivity from one another, so that one cell can be divided into a plurality of units called sectors.

In such a case, it is possible to handle one sector as in one cell described above. As disclosed in Non-Patent Literature 4, further, it may be possible to carry out only CoMP (Intra-eNB) between sectors in a cell rather than CoMP (Inter-eNB) between cells at Rel-10 which is an LTE-A start period of time.

Therefore, only in the case where the handover between the sectors is carried out with regard to the W-CDMA base station related to the SHO described in the foregoing embodiment, one sector in the same cell may be defined as the LTE-A base station. Herein, the sectors in the corresponding sets are arranged in the same position. In addition, the sectors are provided with antennas which are equal in directivity to each other, at the same position.

L. Advantages

According to the present embodiment, it is possible to reduce a period of time that the Compressed Mode in accordance with the W-CDMA standard is ON at the time of the Inter-RAT handover from the W-CDMA standard to the LTE-A standard. Simultaneously, it is possible to start communication in the state that the CoMP Mode is validated in the LTE-A standard after the Inter-RAT handover.

As the result, it is possible to reduce electric power to be consumed and to lower the degree of interference to a different mobile station in the SF/2 which is one example of the Compressed Mode. Moreover, it is possible to reduce an amount of data to be transmitted, in the higher layer scheduling which is another example of the Compressed Mode.

Further, it is possible to start communication in the state that the CoMP Mode is validated. Therefore, it is possible to reduce errors which may occur in the case where the CoMP is not carried out. As the result, it is possible to improve a user throughput and a cell throughput.

It is to be understood that the disclosed embodiments are only illustrative and not restrictive in all aspects. The scope of the present invention is interpreted by the appended claims rather than the foregoing description, and it is intended that all kinds of variations are included in a meaning and a range equivalent to the claims.

REFERENCE SIGNS LIST

Network, 21, 22, 23 Exchanger, 30 Gateway, 40, 44 Radio network controller, 42, 52, 46 Control network, 100 Mobile station, 102 Transmission antenna, 104 Reception antenna, 110 Housing, 112 Switchover control unit, 114 W-CDMA control unit, 116 LTE-A control unit, 118 Display unit, 120 Microphone, 122 Loudspeaker, 124 Input unit, 130 Transmission module, 132 W-CDMA transmission unit, 134 LTE-A transmission unit, 136, 146 Switch, 140 Reception module, 142 W-CDMA reception unit, 144 LTE-A reception unit, 200, 300 Base station, 210 Control unit, 212 Processor, 214 Memory, 216 Storage unit, 218 Peripheral cell list, 222 Transmission unit, 224 Reception unit, 232 Transmitting antenna, 234 Receiving antenna, 240 Exchanger interface, 250 Control interface.

The invention claimed is:

1. A communication system comprising:
a plurality of first base stations for establishing radio communication with a mobile station in accordance with a first communications procedure;
a plurality of second base stations for establishing radio communication with the mobile station in accordance with a second communications procedure, the plurality of second base stations being arranged while being correlated with the plurality of first base stations, respectively, and in each set of the first base station and the second base station correlated with each other, being substantially identical with a cell range of the second base station;
wherein the mobile station is configured to start multipoint radio communication with two or more of the first base stations;
wherein the first base station is configured to:
when the multipoint radio communication with the two or more first base stations is established,
designate, for the mobile station, the second base station correlated with one of the two or more first base stations, and
request the mobile station temporarily suspend the radio communication in accordance with the first communications procedure and to perform measurement only for the designated second base station; and
wherein the first base station is further configured to determine, based on a result of the measurement for the designated second base station, whether or not a handover from the first communications procedure to the second communications procedure is possible and whether or not a coordination mode in which the two or more second base stations including the designated second base station establish communication with the mobile station in coordination with each other is validated, and when it is determined that the handover is possible and that the coordination mode is validated, notify the mobile station of a request for activating the coordination mode as well as the request for starting the handover, when it is determined that the handover is possible but the coordination mode cannot be validated, notify the mobile station of a request for starting the handover.

2. The communication system according to claim 1, wherein the request for starting the coordination mode includes information of a method of reporting, to the second base station, a result of measurement for the two or more second base stations.

3. The communication system according to claim 2, wherein the information of the method of reporting to the second base station includes designation of a communication method for transmitting information of each channel measured by the mobile station.

4. The communication system according to claim 1, wherein the first base station is further configured to select any one of a plurality of modes in which the two or more second base stations are capable of establishing communication in coordination with each other, on the basis of the result of the measurement for the two or more second base stations.

5. The communication system according to claim 1, wherein the first base station is further configured to, when the multipoint radio communication with the two or more first base stations is established, determine whether or not the handover from the first communications procedure to the second communications procedure is required, on the basis of a result of measurement for the two or more first base stations measured by the mobile station.

6. The communication system according to claim 1, wherein when the mobile station receives the notification of the handover from the first communications procedure to the second communications procedure, the mobile station terminates the operation of temporarily suspending the radio communication in accordance with the first communications procedure.

7. The communication system according to claim 1, wherein the second base station correlated with the first base station which is a serving cell in the multipoint radio communication with the two or more first base stations is designated.

8. A communication method in a communication system that includes a plurality of first base stations for establishing radio communication with a mobile station in accordance with a first communications procedure and a plurality of second base stations for establishing radio communication with the mobile station in accordance with a second communications procedure, wherein the plurality of second base stations is arranged while being correlated with the plurality of first base stations, and in each set of the first base station and the second base station correlated with each other, a cell range of the first base station being substantially identical with a cell range of the second base station, the communication method comprising:

a step of starting multipoint radio communication between the mobile station and two or more of the first base stations;

a step of designating by the first base station, for the mobile station, the second base station correlated with one of the two or more first base stations, and requesting the mobile station to temporarily suspend the radio communication in accordance with the first communications procedure and to perform measurement only for the designated second base station, when the multipoint radio communication with the two or more first base stations is established;

a step of receiving at the first base station a result of the measurement for the designated second base station;

a step of determining at the first base station, based on a result of the measurement for the designated second base station, whether or not a handover from the first communications procedure to the second communications procedure is possible and whether or not a coordination mode in which the two or more second base stations including the designated second base station establish communication with the mobile station in coordination with each other is validated, and a step of, when it is determined that the handover is possible and that the coordination mode is validated, notifying the mobile station of a request for activating the coordination mode as well as the request for starting the handover, a step of, when it is determined that the handover is possible but the coordination mode cannot be validated, notify the mobile station of a request for starting the handover.

9. The communication method according to claim 8, wherein the request for starting the coordination mode includes information of a method of reporting, to the second base station, a result of measurement for the two or more second base stations.

10. The communication method according to claim 9, wherein the information of the method of reporting to the second base station includes designation of a communication method for transmitting information of each channel measured by the mobile station.

11. The communication method according to claim 8, further comprising:

a step of selecting any one of a plurality of modes in which the two or more second base stations are capable of establishing communication in coordination with each other, on the basis of the result of the measurement for the two or more second base stations.

12. The communication method according to claim 8, further comprising:

a step of determining whether or not the handover from the first communications procedure to the second communications procedure is required, on the basis of a result of measurement for the two or more first base stations measured by the mobile station, when the multipoint radio communication with the two or more first base stations is established.

13. The communication method according to claim 8, wherein
   when the mobile station receives the notification of the handover from the first communications procedure to the second communications procedure, the mobile station terminates the operation of temporarily suspending the radio communication in accordance with the first communications procedure.

14. The communication method according to claim 8, wherein
   the second base station correlated with the first base station which is a serving cell in the multipoint radio communication with the two or more first base stations is designated.

* * * * *